United States Patent
Hu et al.

(10) Patent No.: US 10,686,691 B2
(45) Date of Patent: Jun. 16, 2020

(54) INTELLIGENT HIGH-SPEED UNMANNED VEHICLE COMMUNICATIONS VIA BIO-INSPIRED MULTI-BEAM PIPE TRANSMISSION

(71) Applicants: The Board of Trustees of the University of Alabama, Tuscaloosa, AL (US); San Diego State University (SDSU) Foundation, San Diego, CA (US)

(72) Inventors: Fei Hu, Tuscaloosa, AL (US); Qian Mao, Tuscaloosa, AL (US); Lei Hu, Tuscaloosa, AL (US); Sunil Kumar, San Diego, CA (US)

(73) Assignees: The Board of Trustees of the University of Alabama, Tuscaloosa, AL (US); San Diego State University (SDSU) Foundation, San Diego, CA (US)

( * ) Notice: Subject to any disclaimer, the term of this patent is extended or adjusted under 35 U.S.C. 154(b) by 0 days.

(21) Appl. No.: 16/033,760

(22) Filed: Jul. 12, 2018

(65) Prior Publication Data
US 2019/0020572 A1    Jan. 17, 2019

Related U.S. Application Data

(60) Provisional application No. 62/531,621, filed on Jul. 12, 2017.

(51) Int. Cl.
*H04L 12/28*    (2006.01)
*H04L 12/751*    (2013.01)
(Continued)

(52) U.S. Cl.
CPC .............. *H04L 45/08* (2013.01); *G06N 3/04* (2013.01); *H04B 7/0617* (2013.01);
(Continued)

(58) Field of Classification Search
CPC ....................................................... H04L 12/28
(Continued)

(56) References Cited

U.S. PATENT DOCUMENTS

2018/0356405 A1*    12/2018    Chou ................. G01N 21/6428

OTHER PUBLICATIONS

L. Hu et al., "Moth- and Ant-Inspired Routing in Hierarchical Airborne Networks with Multi-Beam Antennas," IEEE Transactions on Mobile Computing, 2018.
(Continued)

*Primary Examiner* — Dang T Ton
(74) *Attorney, Agent, or Firm* — Meunier Carlin & Curfman LLC

(57) ABSTRACT

Disclosed and described herein are smart, high-speed UV communication protocols, inspired by the biological principles. The disclosed and described protocols use a 'pipe' routing topology to deliver large amount of data among the UVs equipped with multi-beam antennas. The disclosed and described embodiments include bio-inspired pipe routing and adaptive batch coding (ABC) based congestion control. In regard to bio-inspired pipe routing, a human's brain uses highly cooperative neuro cells to memorize everything. Inspired by neuro networks, a pipe architecture with high-throughput node-to-node data delivery is disclosed and described herein. The pipe routing uses multi-beam antennas to achieve parallel data transmission. In regard to ABC based congestion control, a new network coding called ABC is disclosed, which can minimize traffic congestion occurrences in the above pipe routing. The disclosed and described transport layer protocol includes both end-to-end reliability and congestion control.

18 Claims, 15 Drawing Sheets

(51) Int. Cl.

| | | |
|---|---|---|
| H04B 7/06 | (2006.01) | |
| H04W 40/02 | (2009.01) | |
| H04W 4/40 | (2018.01) | |
| H04L 1/00 | (2006.01) | |
| G06N 3/04 | (2006.01) | |
| H04L 1/18 | (2006.01) | |
| G06N 3/02 | (2006.01) | |
| H04W 84/18 | (2009.01) | |
| H04W 84/06 | (2009.01) | |

(52) U.S. Cl.
CPC ......... *H04B 7/0695* (2013.01); *H04L 1/0076* (2013.01); *H04L 1/187* (2013.01); *H04W 4/40* (2018.02); *H04W 40/02* (2013.01); *G06N 3/02* (2013.01); *H04L 1/0009* (2013.01); *H04L 2001/0092* (2013.01); *H04W 84/06* (2013.01); *H04W 84/18* (2013.01)

(58) Field of Classification Search
USPC ........................................................ 370/329
See application file for complete search history.

(56) References Cited

OTHER PUBLICATIONS

AT&T 18-beam antennas, please see the news from Commscope: (website visited in Oct. 2015) http://www.commscope.com/Blog/RF- Engineers-Gush-Over-Multi-beam-Antennas/ , Also see the following web on more details: http://www.commscope.com/Solutions/Sector-Sculpting-Solutions/.

MatSing multi-beam antennas, please see the web for more product de-tails: (web visited in Dec. 2015) http://www.matsing.com/products/multi- beam-base-station-antennas.

S. Atmaca, C. Ceken, and I. Erturk, Capacity Enhancement in Wireless Networks using Directional Antennas, International Journal of Electrical, Computer, Energetic, Electronic and Communication Engineering, vol. 2, No. 7, 2008.

P. C. Liu et al., "Analyzing the TCP performance on mobile ad-hoc networks," 13th International Conference on Advanced Communication Technology (ICACT), Seoul, 2011, pp. 143-148.

W. Ge, Y. Shu, L. Zhang, L. Hao and O. W. w. Yang, "Measurement and Analysis of TCP Performance in IEEE 802.11 Wireless Network," 2006 Canadian Conference on Electrical and Computer Engineering, Ottawa, Ont., 2006, pp. 1846-1849.

A. Boto, Z. A. Polgar and V. Bota, "Analysis of a transport protocol based on rateless erasure correcting codes," Intelligent Computer Communication and Processing (ICCP), 2010 IEEE International Conference on, Cluj-Napoca, 2010, pp. 465-471.

J. K. Sundararajan, D. Shah, M. Medard, S. Jakubczak, M. Mitzenmacher and J. Barros, "Network Coding Meets TCP: Theory and Implementation," in Proceedings of the IEEE, vol. 99, No. 3, pp. 490-512, Mar. 2011.

H. Balakrishnan, V. N. Padmanabhan, S. Seshan, and R. H. Katz, "A comparison of mechanisms for improving TCP performance over wireless links," IEEE/ACM Transactions on Networking, vol. 5, No. 6, pp. 756-769, Dec. 1997.

A. M. Al-Jubari, M. Othman, B. M. Ali, N. A. W. A. Hamid, "An Adaptive Delayed Acknowledgment Strategy to Improve TCP Performance in Multi-hop Wireless Networks," Wireless Personal Communications, vol. 69, No. 1, pp. 307-333, Mar. 2013.

S. V. Jansi Rani, P. Narayanasamy, J. John Shiny, "A cross layer approach for improving TCP performance using channel access information," in Proceedings of 2013 International Conference on Communications and Signal Processing (ICCSP), pp. 587-591, Melmaruvathur, Apr. 2013.

R. Cheng, D. Deng, "Congestion control with dynamic threshold adaptation and cross-layer response for TCP Vegas over IEEE 802.11 wireless networks," International Journal of Communication Systems, vol. 27, No. 11, pp. 2918-2930, Nov. 2014.

Internet Engineering Task Force (IETF), RFC 6824-TCP Extensions for Multipath Operation with Multiple Addresses, Jan. 2013, https://tools.ietf.org/html/rfc6824.

K. Bao, F. Hu, S. Kumarl, AI-Augmented, Ripple-Diamond-Chain Shaped, Rateless Routing in Wireless Mesh Networks with Multi-Beam Directional Antennas, (under review) IEEE Transactions on Mobile Computing, 2016.

A. Loch, M. Hollick, A. Kuehne, and A. Klein, "Practical OFDMA for Corridor-based Routing in Wireless Multihop Networks," 39th Annual IEEE Conference on Local Computer Networks (LCN 2014), Edmonton, Canada, Sep. 8-11, 2014, pp. 1-9.

R. Ahlswede, N. Cai, S. R. Li, R. W. Yeung, "Network Information Flow," IEEE Transactions on Information Theory, vol. 46, No. 4, Jul. 2000, pp. 1204-1216.

S. Chachulski, M. Jennings, S. Katti, D. Katabi, "Trading Structure for Randomness in Wireless Opportunistic Routing," in Proc. of ACM SIGCOMM 2007, pp. 169-180.

R. Koetter, M. Medard, "An algebraic approach to network coding," IEEE/ACM Transactions on Networking, vol. 11, No. 5, Oct. 2003, pp. 782-795.

J.-S. Park, M. Gerla, D. S. Lun, Y. Yi, M. Medard, "CodeCast: A Network Coding based Ad hoc Multicast Protocol," IEEE Wireless Communications, vol. 13, No. 5, Oct. 2006, pp. 76-81.

C. Chen, S. Y. Oh, P. Tao, M. Gerla, M. Y. Sanadidi, "Pipeline Network Coding for Multicast Streams," in International Conference on Mobile Computing and Ubiquitous Networking (ICMU 2010), Apr. 2010, pp. 1-7.

M. Luby, "LT codes," in Proceedings of the Annual IEEE Symposium on Foundations of Computer Science, Nov. 2002, pp. 271-280.

Y. Sankarasubramaniam, O. B. Akan, and I. F. Akyildiz, "ESRT: Event-to-sink reliable transport in wireless sensor networks," IEEE/ACM Transactions on Networking, vol. 13, No. 5, Oct. 2005, pp. 1003-1016.

Y. Wu, S. Kumar, F. Hu, Y. Zhu, J. D. Matyjas, "Cross-Layer Forward Error Correction Scheme Using Raptor and RCPC Codes for Prioritized Video Transmission Over Wireless Channels," IEEE Transactions on Circuits and Systems for Video Technology, vol. 24, No. 6, Jun. 2014, pp. 1047-1060.

J. K. Sundararajan, D. Shah, M. Medard, S. Jakubczak, M. Mitzenmacher, and J. Barros, "Network Coding Meets TCP: Theory and Implementation," in Proceedings of the IEEE, vol. 99, No. 3, Jan. 2011, pp. 490-512.

Y. Cui, L. Wang, X. Wang, H. Wang, Y. Wang, "FMTCP: A Fountain Code-based Multipath Transmission Control Protocol," 2012 IEEE 32nd International Conference on Distributed Computing Systems (ICDCS), Jun. 2012, pp. 366-375.

Z. Zhou, H. Mo, Y. Zhu, Z. Peng, J. Huang, J. Cui, "Funtain Code based Adaptive Multihop Reliable Data Transfer for Underwater Acoustic Networks", 2012 IEEE International Conference on Communications (ICC), Jun. 2012, pp. 6396-6400.

M. Kawato, Y. Uno, M. Isobe, and R. Suzuki, "Hierarchical neural network model for voluntary movement with application to robotics," IEEE Control Systems Magazine, vol. 8, No. 2, pp. 8-15, 1988.

D. Ganesan, R. Govindan, S. Shenker, and D. Estrin, "Highly-resilient, energy-efficient multipath routing in wireless sensor networks," ACM Sigmobile Mobile Computing and Communications Review, vol. 5, No. 4, pp. 11-25, 2001.

B. Krishnamachari, D. Estrin, and S. Wicker, "Modelling data-centric routing in wireless sensor networks," in IEEE infocom, vol. 2, 2002, pp. 39-44.

Y. Ganjali and A. Keshavarzian, "Load balancing in ad hoc networks: single-path routing vs. multi-path routing," in INFOCOM 2004. Twenty- third Annual Joint Conference of the IEEE Computer and Communications Societies, vol. 2. IEEE, 2004, pp. 1120-1125.

I. Cidon, R. Rom, and Y. Shavitt, "Analysis of multi-path routing," IEEE/ACM Transactions on Networking (TON), vol. 7, No. 6, pp. 885-896, 1999.

A. B. Malany, V. S. Dhulipala, and R. Chandrasekaran, "Throughput and delay comparison of manet routing protocols," Int. J. Open Problems Compt. Math, vol. 2, No. 3, pp. 461-468, 2009.

(56) References Cited

OTHER PUBLICATIONS

S. Lu, L. Li, K.-Y. Lam, and L. Jia, "Saodv: a manet routing protocol that can withstand black hole attack," in Computational Intelligence and Security, 2009. CIS'09. International Conference on, vol. 2. IEEE, 2009, pp. 421-425.

T. Song, W. Xia, T. Song, and L. Shen, "A cluster-based directional routing protocol in vanet," in Communication Technology (ICCT), 2010 12th IEEE International Conference on. IEEE, 2010, pp. 1172-1175.

Y. Zeng, K. Xiang, D. Li, and A. V. Vasilakos, "Directional routing and scheduling for green vehicular delay tolerant networks," Wireless networks, vol. 19, No. 2, pp. 161-173, 2013.

S. Bandyopadhyay, K. Hasuike, S. Horisawa, and S. Tawara, "An adaptive MAC and directional routing protocol for ad hoc wireless network using espar antenna," in Proceedings of the 2nd ACM international symposium on Mobile ad hoc networking & computing. ACM, 2001, pp. 243-246.

B. Hu and H. Gharavi, "Directional routing protocols for ad-hoc networks," IET communications, vol. 2, No. 5, pp. 650-657, 2008.

P. Lauder, R. Kummerfeld, and A. Fekete, "Hierarchical network routing," in Communications Software, 1991, 'Communications for Distributed Applications and Systems', Proceedings of TRICOMM'91., IEEE Conference on. IEEE, 1991, pp. 105-114.

L. Kleinrock and F. Kamoun, "Hierarchical routing for large networks performance evaluation and optimization," Computer Networks (1976), vol. 1, No. 3, pp. 155-174, 1977.

D. A. Nugroho, A. Prasetiadi, and D.-S. Kim, "Male-silkmoth-inspired routing algorithm for large-scale wireless mesh networks," Journal of Communications and Networks, vol. 17, No. 4, pp. 384-393, 2015.

L. F. M. Vieira, U. Lee, and M. Gerla, "Phero-trail: a bio-inspired location service for mobile underwater sensor networks," IEEE Journal on Selected Areas in Communications, vol. 28, No. 4, pp. 553-563, 2010.

O. Sporns, "Contributions and challenges for network models in cognitive neuroscience," Nature neuroscience, vol. 17, No. 5, pp. 652-660, 2014.

N. Cheng, M. Yuksel, and S. Kalyanaraman, "Orthogonal rendez-vous routing protocol for wireless mesh networks," IEEE/ACM Transactions on Networking (ToN), vol. 17, No. 2, pp. 542-555, 2009.

D. Braginsky and D. Estrin, "Rumor routing algorithm for sensor networks," in Proceedings of the 1st ACM international workshop on Wireless sensor networks and applications. ACM, 2002, pp. 22-31.

V.R.T. Le and M. Gerla, "Cognitive routing with the ETX metric," 2014 13th Annual Mediterranean Ad Hoc Networking Workshop (MED-HOC-NET), Piran,, pp. 188-194, 2014.

A. Rao and I. Stoica, "An overlay mac layer for 802.11 networks," in Proceedings of the 3rd international conference on Mobile systems, applications, and services. ACM, 2005, pp. 135-148.

W. Zhou, X. Chen, and D. Qiao, "Practical routing and channel assignment scheme for mesh networks with directional antennas," in 2008 IEEE International Conference on Communications. IEEE, 2008, pp. 3181-3187.

\* cited by examiner

INTELLIGENT HIGH-SPEED UNMANNED VEHICLE COMMUNICATIONS VIA BIO-INSPIRED MULTI-BEAM PIPE TRANSMISSION

CROSS-REFERENCE TO RELATED APPLICATION

This application claims priority to and benefit of U.S. provisional patent application Ser. No. 62/531,621, filed Jul. 12, 2017, which is fully incorporated by reference and made a part hereof.

GOVERNMENT SUPPORT CLAUSE

This invention was made with government support under U.S. DOD # FA8750-14-1-0075 awarded by the U.S. DoD (Department of Defense). The government has certain rights in the invention.

BACKGROUND

With the popularity of unmanned vehicles including unmanned aerial vehicles (UAVs) and environment surveillance applications, airborne networks (ANs) have become important platforms for wireless transmissions in the sky.

Today there are numerous unmanned vehicles (UVs) including UAVs (unmanned aerial vehicles), UGVs (unmanned ground vehicles), UUWVs (unmanned underwater vehicles) and products for either civilian or military applications, and the use of UVs is expected to grow dramatically in the future. For example, Amazon plans to use UAVs to deliver customers' goods; Tesla and others have designed and continue to develop UGVs; vehicles; UAVs are used for environment surveillance/weather reporting; and there are numerous other applications and more are being developed.

With the increase of UVs, collaboration communications have become important because many nodes can cooperate to wirelessly relay network data for a long distance. For example, remote sensing can be performed via multi-hop UAV communications. However, UV communications also bring many challenges. First, it is desired to see them smartly cooperate with each other to avoid wireless transmission conflicts. They should send out data without much traffic congestion. Second, it is desired that the network has high-speed data delivery. With the coming big data era, many nodes need to schedule their communications carefully to deliver as much data as possible.

In some instances, UVs use hierarchical hybrid wireless network ($H^2WN$) comprised of a two-level topology and hybrid antenna systems (omni-/multi-directional antennas). In the high-level network, it has a relatively sparse topology comprising powerful nodes that can communicate with each other with long-distance links. Those nodes are equipped with multi-directional antennas in order to achieve a multi-beam high-rate transmission. In the low-level network, it has a much higher node density than the high-level network. Those nodes also have much lower mobility. To reduce the cost, they are equipped with omni-directional antennas.

Such a hierarchical network can be seen in many applications such as airborne networks, smart factory, sensor and actuator networks, and the like. The reason that such a hierarchical architecture is popular is because of its separation of different types of wireless nodes, easy network management, and good balance between cost and throughput. For instance, the expensive high-level nodes can be used to deliver the high-throughput data that is generated from many low-level cheap nodes. Typically, there is a 'sink' node in the low-level network that can collect event data from any node. The high-level network often has a node that serves as the role of 'commander' that can control the whole network.

Today's antenna systems have been improved drastically these years due to the rapid development of circuits and materials. The inexpensive popular antenna is omni-directional antenna. It simply radiates the same signal to all directions even though it may target only a specific node. Thus, it can cause interference among the neighbors. To better focus the energy on a specific direction, directional antenna with one beam (also called unidirectional antenna) can be used. Since all signal energy is concentrated in a single angle, it avoids the interference with other directions, and also is able to send data for a longer distance than omnidirectional antenna. A multiple-input and multiple-output (MIMO) antenna has complex antenna matrix coefficient control and needs the receiver's real-time feedback. Another antenna is the multi-beam smart antenna (MBSA). The MBSA extends the single-beam antenna to multi-beam structure, and allows independent transceivers to be used in each beam. Each beam can send out different data according to its own queue management policy. Thus, a MBSA significantly improves the throughput through simultaneous data transmissions in multiple directions. Since it does not rely on the receiver's feedback, some beam directions may have poor performance. But those beams can 'help' each other by using detour beam transmissions.

There are challenges in the use of $H^2WN$ networks for UVs. In particular, there is a need to address routing protocol design issues.

For low-level routing, there is a desire to improve general event-to-sink routing search in $H^2WN$ networks for UVs. In particular, the sink's singular mobility needs to be addressed for UV applications. Unlike the high-level nodes that have 'even mobility', that is, each node has similar mobility (for aircraft network, it is generally 80-120 m/s), the low-level network has 'singular mobility', that is, most nodes may have little or low mobility, while the sink could have high mobility due to its task of global data collection. To handle the sink's singular mobility, even an on-demand (reactive) routing could not fast track the sink's sudden leaving, not mentioning the proactive routing that only works well for semi-static network topology. As a matter of fact, since most of other low-level nodes do not have such sudden leaving, the global path search via blind RREQ broadcasting would cause much routing overhead in a high-density, low-rate ad hoc network.

For high-level routing, one challenge is how to maximize the benefits of multi-beam antennas in the routing process. Conventional ad hoc routing schemes such as DSR only use one path to deliver the data. Thus, they only need one of the beams in the MBSAs for communications. General multi-path routing schemes often use widely disjointed paths to deliver data. Such disjoint paths do not have many intersection points among them. Since only those intersection points can possibly use multiple beams to deliver data, the nodes cannot fully explore all the available beams to improve the throughput. It is challenging to design a low-overhead, high-throughput, multi-beam routing among the long-distance links.

Regarding cross-level routing, an important issue is how an event node in the low level can quickly localize the commander node in the high level, and then efficiently forwards the data to a low-level node that is closest to the commander node. Note that the high-level network is much sparser than the low-level network. Thus it is difficult for an event node to find the closest high-level node.

Therefore, there exists a need to overcome challenges in the art, some of which are described above.

SUMMARY

Disclosed and described herein are smart, high-speed UV communication protocols, inspired by the biological principles. The disclosed and described protocols use a 'pipe' routing topology to deliver large amount of data among the UVs equipped with multi-beam antennas. The disclosed and described embodiments include bio-inspired pipe routing and adaptive batch coding (ABC) based congestion control. In regard to bio-inspired pipe routing, a human's brain uses highly cooperative neuro cells to memorize everything. Inspired by neuro networks, a pipe architecture with high-throughput node-to-node data delivery is disclosed and described herein. The pipe routing uses multi-beam antennas to achieve parallel data transmission. In regard to ABC based congestion control, a new network coding called ABC is disclosed, which can minimize traffic congestion occurrences in the above pipe routing. The disclosed and described transport layer protocol includes both end-to-end reliability and congestion control.

The disclosed and described embodiments overcome challenges in today's UV networks including how to use directional antennas to achieve high-speed routing and how to improve TCP-based transport control scheme. In regard to high-speed routing, an UV network needs a routing layer (RL). Existing UVs are often equipped directional antennas. However, no current routing protocols effectively utilize those directional antennas to achieve a high-speed transmission. As disclosed and described herein, the human brain neural network concept is used to build a pipe routing topology, and carefully control the node-to-node directional transmissions under the use of multi-beam antennas. Experiments conducted on such networks demonstrate the high-throughput delivery under such a bio-inspired multi-beam routing. In regard to improving TCP-based transport control scheme, an UV network needs a transport Layer for end-to-end reliability and congestion control. TCP is the most popular transmission layer protocol; however, it has drawbacks due to its saw-like sending rate control. Disclosed and described herein is an entirely new transport layer protocol, which is ABC-based scheme. The disclosed and described ABC is new network coding scheme. It significantly improves the network throughput in multi-beam routing.

Disclosed and described herein are embodiments of a method, system and computer program product for routing communication in a hierarchical hybrid wireless network (H$^2$WN). Generally, the embodiments comprise providing the H$^2$WN comprised of at least two levels, a higher level and a lower level, wherein each level is comprised of a plurality of nodes and each of the plurality of nodes comprise a multi-beam smart antenna (MBSA); providing bio-inspired communication routing in each of the higher level and the lower level of the H$^2$WN; and providing congestion control in the communication routing. In various aspects, the bio-inspired communication routing comprises one or more of neuron-inspired higher level network routing, moth-inspired lower level network routing, and ant-inspired cross-level routing. The neuron-inspired higher level network routing comprises utilizing a fence routing algorithm to dispatch data to multiple beams of one or more of the MBSAs that comprise the higher level network. The moth-inspired lower level network routing comprises utilizing a line-fan-ring (LFR) routing search algorithm to handle a sink's singular mobility issue in the lower level network. The ant-inspired cross-level routing comprises one or more lower level nodes recording a trajectory of a commander node that is in the higher level network, and creating a time-decaying routing path to reach the commander node from any place in the low-level network.

The congestion control comprises a transport layer protocol that considers characteristics of MBSAs. In one aspect, the transport layer protocol comprises adaptive batch coding (ABC). The ABC comprises automatically adjusting a size of a redundancy matrix size based on congestion control levels, wherein the ABC adaptively adds low redundancy to data in order to resist general loss due to allow level of congestion and adopts fast retransmission and shrinks a coding batch size during high congestion situations.

The disclosed and described H$^2$WN can be used to control one or more unmanned vehicles. For example, the H$^2$WN can be used to control one or more unmanned aerial vehicles, unmanned ground vehicles or unmanned underwater vehicles.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1 is an illustration of

DETAILED DESCRIPTION

Figure 1:
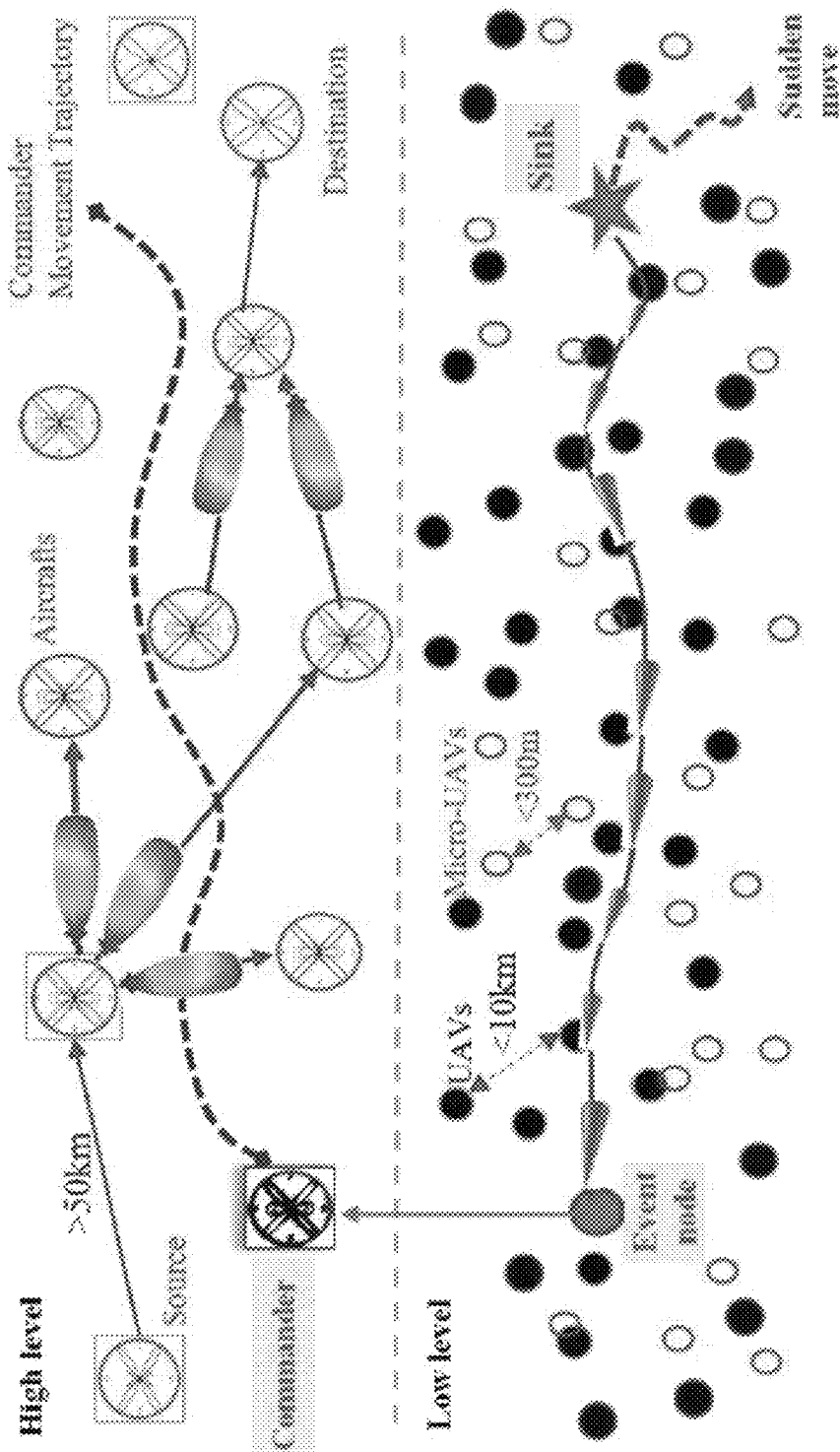

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Disclosed and described herein are intelligent, high-speed UV communication protocols, inspired by the biological principles. The disclosed and described protocols use a pipe routing topology to deliver large amount of data among UVs equipped with multi-beam antennas. The bio-inspired routing for the hierarchical directional network include neuron-inspired higher level network routing, moth-inspired lower level network routing, and ant-inspired cross-level routing. FIG. 1 illustrates the challenges faced with routing issues in a hierarchical directional wireless network.

In regard to neuron-inspired higher level network routing, the human brain has a mysterious, highly coupled neural network structure that stores the entire human life's memory. The neurons use weighted bio-electronical pulses to deliver the information. Inspired by such a weighted neuron grid structure, disclose and described herein is a fence-like routing scheme to dispatch the data to multiple beams. Such a fence routing structure can explore the high-capacity of MBSAs very well.

In regard to moth-inspired lower level network routing: a male moth has a peculiar trajectory when searching for a light source. It follows a straight line first, then follows zigzag curve, and finally uses circular trajectory to lock the source. Such a pattern helps to quickly localize the uncertain light source. Inspired by moth movement, disclosed and described herein is a line-fan-ring (LFR) routing search scheme to handle the sink's singular mobility issue in the lower level network.

In regard to ant-inspired cross-level routing: ants use striking chemical scents to record the trajectory such that their partners can quickly find the food source. Such a trail has time-decaying feature. Inspired by ant chemical trail, disclosed and described herein is the use of high-density low-level nodes to record the trajectory of the commander node that is in the high-level network, and creation of a time-decaying routing path to reach the commander node from any place in the low-level network.

The disclosed $H^2WN$ is comprised of hybrid antennas and, in particular, MBSAs. The features of MBSAs include Tx/Rx consistency, beam synchronization, and beam locking. In regard to Tx/Rx consistency, all beams can send (Tx) or receive (Rx) data. And each beam can operate in different channels. However, for those beams using the same channel, they should obey beam consistency principles, that is, those beams should be either ALL-Tx or ALL-Rx mode. The reason for this constraint is due to the energy leaking from one beam's main lobe into another beam's side lobe if they are in different Tx/Rx modes. Of course, if they use different channels, there will be no energy leaking since there is no radio interference between different channels. In regard to beam synchronization, all the beams of the same MBSA can handle the data concurrently although they can send data with different starting times. The reason of this limit is to better explore the link capacity of each beam. Suppose a beam sends data late, the bandwidth of that beam will be wasted. In regard to beam locking, if a beam finishes its data transmission earlier than other beams, it can NOT change its Tx/Rx mode if there exist other beams that are using the same channel to send/receive data. For this case, this beam can switch the channel in order to change its Rx/Tx mode. Due to these principles, it is desired to schedule the data transmission in the hop-to-hop routing path carefully among the high-level nodes, in order to fully explore the high-capacity of the MBSAs, meanwhile not violating the above communication constraints in different directions.

Figure 2:
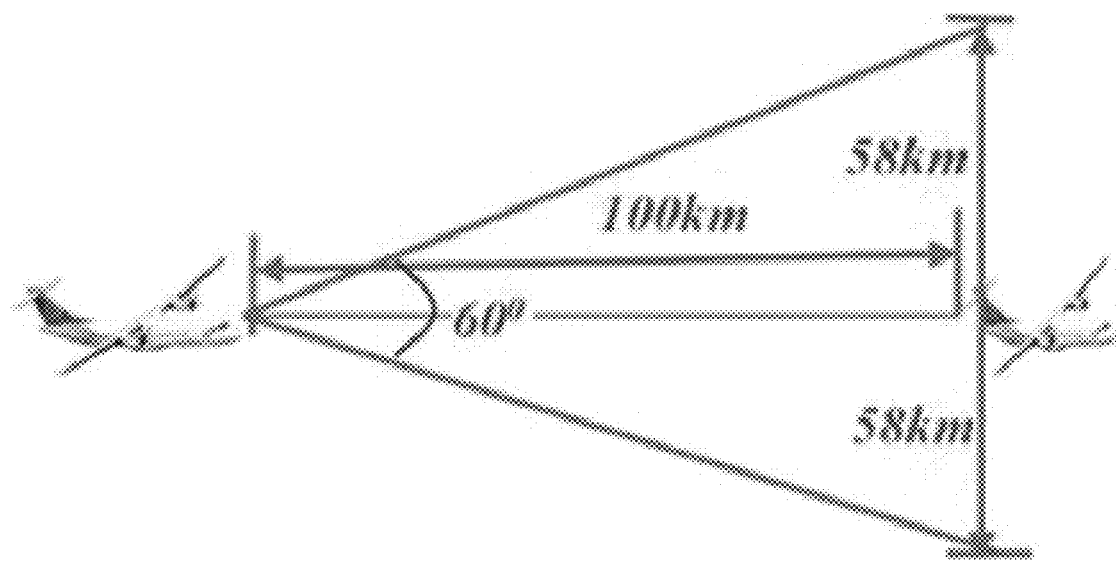
FIG. 2 is an exemplary illustration of the impact of high mobility of a node.

In regard to the impacts of high mobility in the high-level network: In airborne networks, the high-level nodes may be aircraft, which could have high mobility. However, such a high mobility does not mean that a relatively stable routing topology cannot be built. As shown in FIG. 2, assume a beam has 60 degree of coverage. The aircraft-to-aircraft distance could be 100 km long. An aircraft with initial position in the center of the scope and the mobility of 120 m/s will take average 8 minutes to fly out of a beam's scope (58 km long). For such a long time, any routing protocol could easily finish a typical communication session. Even though the light propagation delay is 0.3 ms for 100 km of link distance, a common DSR-based routing protocol just needs around 5 ms of time to finish the propagation of RREP and receive the RREQ. Therefore, for airborne network, high mobility is not a main concern in terms of routing protocol stability.

Herein, an airborne network as a $H^2WN$ example, but it is to be appreciated that the embodiments disclosed herein are not limited to airborne applications. The disclosed routing schemes can be easily extended to other $H^2WN$ applications. In the low-level airborne network, the unmanned aerial vehicles (UAVs) have limited antenna gain and short radio propagation distance (<10 km). It can be assumed that an UAV can only reach the aircraft right above it. If the commander node moves to another place, a UAV needs to search the routing path to reach a UAV that is closest to the commander. This is the motivation of recording the trajectory of the commander by using the high-density UAV network.

As noted, the disclosed $H^2WN$ is comprised of a high-level network having neuro-inspired multi-beam routing. The high-level network is comprised of powerful nodes with MBSAs. As an example, aircraft can use high-gain MBSAs to send data to all directions within a >50 km of radius. The high-level routing should fully explore the benefits of multi-beam, concurrent Tx/Rx capabilities; however, none of the existing ad hoc routing schemes explores the MBSAs' benefits very well. As disclosed herein, the throughput maximization problem for a particular communication pair is targeted by using as many beams as possible to deliver data. Thus, multiple beam pairs automatically benefit from each individual, throughput-maximized communication pair.

It has been found that that there exist essential commonalities between neural networks and MBSA-based routing. MBSA-like tentacles help a neuron to quickly deliver pulses to neighboring neurons. Using special cell microscopy, people have found that a neuron could have numerous tentacles in its ending location. Those tentacles look like a MBSA's beams. A neuron could fast pump different amplitudes of bio-electrical signals into hundreds of tentacles simultaneously. Those tentacles send or accept bio-pulses concurrently. This matches with MBSA's Tx/Rx consistency and beam synchronization principles (see above). The neurons use tentacles with different biological amplitudes ('weights') to form the large neural network. A neuron's tentacles do not use the same pulse control level. Each tentacle has very different bio-pulse amplitudes. Using those 'weighted links', billions of neurons form a perfectly coupled neural network in the brain. A human brain quickly recalls something by building a main neuron-chain. Although the neural network is large, it takes less than 1 millisecond for one to quickly recall something occurred before. Although the concrete large-scale network query scheme is not clear, scientists have found that the brain is able to broadcast a bio-electrical query message to certain area and retrieves the results by enhancing a 'main path' that consists of most relevant neurons. Such a main path is important since it helps to retrieve more and more detailed history information from nearby neurons. It does this by extending the main path to a wider neuron path. This explains why someone remembers something's big picture first, and then retrieves more and more details. Based on the weighted neural network architecture, people have successfully achieved intelligent pattern learning through pre-training and self-learning of those weights before testing a new data set. The entire neural network could have multiple 'hidden layers' with different weights in each neuron link.

Inspired by the above neural network concept, a fence routing for multi-beam transmissions among high-level network nodes has been developed. To determine the main direction and range of such a 'fence' area, first search for a main path, just like the above main neuron-chain idea. Then later on 1- or 2-hop nodes can be added around the main path to form a grid-like fence routing. Although DSR-like RREQ broadcasting can be used to establish a main path, such a blind global broadcasting may cause packet flooding and high routing protocol overhead, especially for large-scale networks.

Using a compass, each node can easily determine 4 directions (east, south, west, and north). If more than 4 beams are available, a node can further distinguish more directions. A simple routing scheme, called ORRP (orthogonal rendezvous routing protocol), only uses two pairs of orthogonal directions (i.e., west-east and south-north) to search for a routing path. ORRP generally comprises two parts: (1) proactive maintenance of rendezvous node: a node maintains multiple rendezvous nodes which may be a few hops of away from the node. A node can easily appoint some nodes as rendezvous nodes by issuing R-RREQ messages to the 4 directions, and then periodically check the existence of those nodes. If they move too far away, they will be replaced with closer ones. (2) reactive establishment of an orthogonal path to one of the rendezvous nodes: If a source wants to search a path to its destination, it sends out RREQ in the 4 directions. If in one of its directions it reaches a rendezvous node, it will use that path as the routing path.

Because RREQ is only limited to 4 directions, it is possible that the sender may never find a rendezvous node. However, it has been shown that the failure probability is less than 4%. And such case only occurs when the network is too sparse. As a matter of fact, any two pairs of orthogonal lines have over 95% of chance to intersect with each other. If the network is too sparse and a rendezvous node cannot be found, conventional DSR-based blind RREQ broadcasting can be used to search for the main path.

Figure 3:
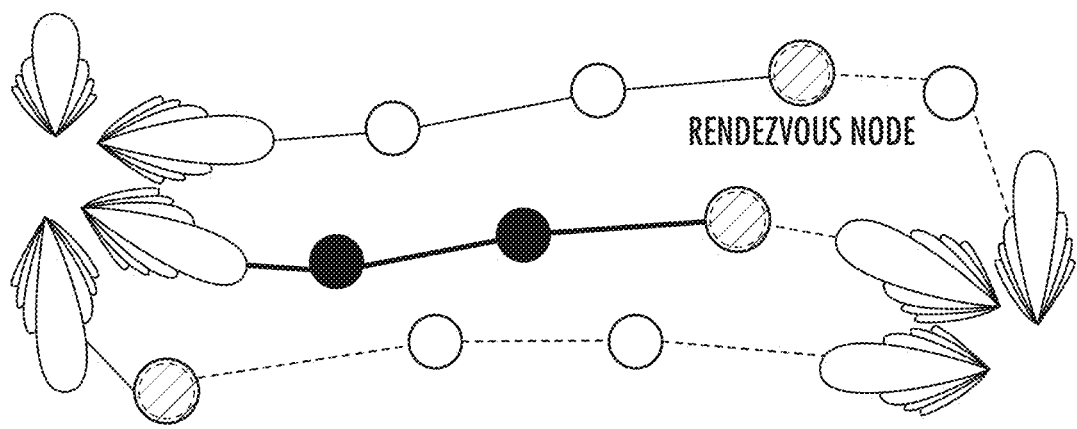
FIG. 3 is an exemplary illustration of enhanced main path searching via two-time launching.

The original ORRP may find a path that is much longer than DSR result. As disclosed herein, ORRP is improved by using two-time launching concept. FIG. 3 illustrates enhanced main path searching via two-time launching. In the first-time launching, the above described method can be used to find two paths (i.e. two pairs of orthogonal lines could have at least two intersection nodes). Thus, it is known that a shorter main path must be in such a near-rectangular area. Then, the sender rotates about 45 degrees toward the "inside" direction (see FIG. 2), and performs the second-time launching, i.e., sending out an RREQ message in the new direction until reaching a rendezvous node that is pre-maintained by the destination node. Note that in a real MBSA it has at least 4 beams (to cover 4 directions). If the MBSA has 1 more beam between any two directions (thus it has total 8 beams), it is not needed to rotate the sender's MBSA because the beam between the two directions could be used to launch the RREQ message. By using the above two-time launching, a main path can be found in the diagonal direction of the rectangular area. Such a main path is very close to the DSR result.

The search process for the main path based on the enhanced ORRP with 4-beam antennas is shown in Algorithm 1, below:

| Algorithm 1 Main path search based on enhanced ORRP scheme |
|---|
| Input: Source Node ID S, Destination Node ID D, two pairs of orthogonal Beam IDs |
| Output: The main path P(S, D) of the fence routing |
| Part One: |

1) D periodically broadcasts ORRP announcement messages along the orthogonal directions from the 2 pairs of orthogonal beams.
2) Each neighboring node that received the messages stores the Destination ID D, the neighbor ID in the previous hop, the hop count and its Beam ID $BID_1$ from which the packets came in.
3) Each relay node forwards the announcement packets using the beam in the opposite direction.
4) Proactively, these relay nodes and destination node maintain the reudezvous-to-destination paths.

Part Two:

1) S sends out the route request packet (RREQ) in its 4 orthogonal beams.

-continued

| Algorithm 1 Main path search based on enhanced ORRP scheme |
|---|

2) The neighboring node that receives the RREQ packet stores the Source ID S, its previous hop, the hop count and beam ID ($BID_2$) from which it received this RREQ, then forwards it to the next hop using the beam in the opposite direction.
3) The subsequent nodes keep forwarding the RREQ along the orthogonal directions in the same way until a rendezvous node R specified in Part One receives the RREQ. This intersection node $R_s$ stops forwarding and sends out a RREP containing the route to destination node D back to node S in the reverse direction.
4) After S receives the RREP packet, it establishes the source-rendezvous-destination path.

Part Three:

1) Based on Part Two, D rotates the beam facing the intersection node $R_s$ for about 45 degrees and then repeats the steps in Part One.
2) S also rotates the corresponding beam for about 45 degrees in the internal direction and repeats the steps in Part Two.
3) There exists a new rendezvous node R', and S can achieve a shorter path which can be taken as the main path P(S, D) in the fence routing.

Figure 4:
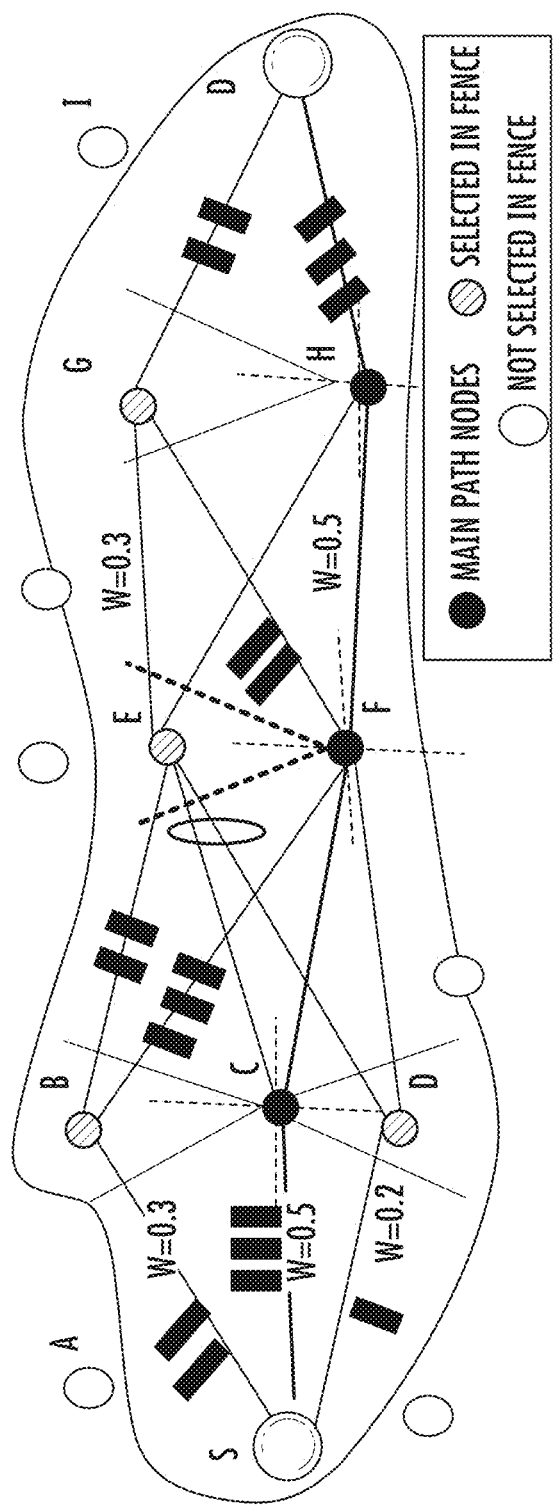
FIG. 4 is an exemplary illustration of establishing fence routing.

Based on the neural network principle, all of the details of a past event can be recovered by activating the nearby neuros around the main path. The links between the neurons have different weights, to reflect the fact that some life details could be remembered better than others. Those weighted neuros form a fence-like 'information pipe' to recover all the relevant memory signals. Therefore, using these neural network principles, a fence routing can be developed. As shown in FIG. 4, once a main path is found (here it is S-C-F-H-D), each node in the main path (except the source and destination) searches the 1-hop away neighbors. Note that here the node is asked to search the 1-hop neighbors in the direction that is orthogonal to its ORRP RREQ forwarding direction. For example, F uses its neighbor E as the fence node, C uses B and D, and H uses G. This is important in order to keep similar distances between neighboring fence nodes (such as B-E and E-G). Since the RSS (received signal strength) is proportional to the link distance in free space, the main path node always selects the node that gives itself a good RSS. It is possible that a main path node does not have any 1-hop neighbor in the orthogonal direction. Or, it may find only one neighbor in one side.

While a node could select 2-hop-away neighbors to serve as fence routing in order to establish more links among them, there are some drawbacks to that approach: (1) in some high-level network such as airborne network, the link distance could be over 100 km. If a longer distance node (such as 2-hop-away nodes) is selected, it may cause ultra-long links. This makes the radio propagation delay (at light speed) longer, and complicates the goal of synchronizing the multi-beam Tx/Rx transmissions due to the large link delay differences. (2) A node may only have 4 beams. If a beam needs to communicate with more than 2 nodes, it needs complex schedule control to avoid packet transmission collisions. (3) Too many nodes in the fence routing make the routing topology maintenance difficult. Therefore, here we only use 1-hop fence nodes. Additionally, in the fence routing, each node should maintain a routing table as shown in Table I.

TABLE I

Routing Table

| Dest. | Beam | Next Hop | Link W | QoS | Applications |
|---|---|---|---|---|---|
| F | 2 | C | 0.50 | 1 | Video Conference |
| B | 1 | B | 0.30 | 3 | Live Stream |
| C | 2 | C | 0.50 | 2 | Video on Demand |
| D | 3 | D | 0.20 | 4 | File Download |

Link weight is used to allocate the traffic amount in each link (more traffic will be assigned to the beam with better link conditions), the link weight needs to be defined accurately. Three parameters (one from each layer) can be used to define the weight:

$$W = W_1 * RSS + W_2 * (1/PER) + W_3 * (1/ETX), \quad (1)$$

where $$W_1 + W_2 + W_3 = 1. \quad (2)$$

Here RSS is a Physical layer parameter, and RSS is proportional to $1/(d^2)$. Packet error rate (PER) is a Data Link layer parameter:

$$PER_j^{(k)} = 1/(1 + e^{\eta*(SINR_j^{(k)} - \sigma)}). \quad (3)$$

Here, the packet error rate (PER) of channel k for a node with priority j is denoted as $PER_j^{(k)}$, where η and σ are constants corresponding to the modulation and coding schemes for a given packet length. ETX (expected transmission count) is a router layer parameter, and has been defined in the literature. The above weight definition reflects the cross-layer design nature of the routing design.

To fully explore the multi-beam concurrent transmissions of MBSAs, the above fence routing scheme should be integrated with the MAC layer schedule control. To fully explore the benefits of MBSA-based routing, it is recommended that the MAC layer use a TDMA-like schedule control between different hops. If the MAC is CSMA-based scheme, a coarse TDMA-based sublayer could be added above the CSMA. Since the TDMA-like schedule uses much longer slot duration (could handle over 10 packets) than general TDMA time slots, adding such a higher sublayer is not a big issue. The cross-layer design is important for a few reasons, as described below.

Figure 5:
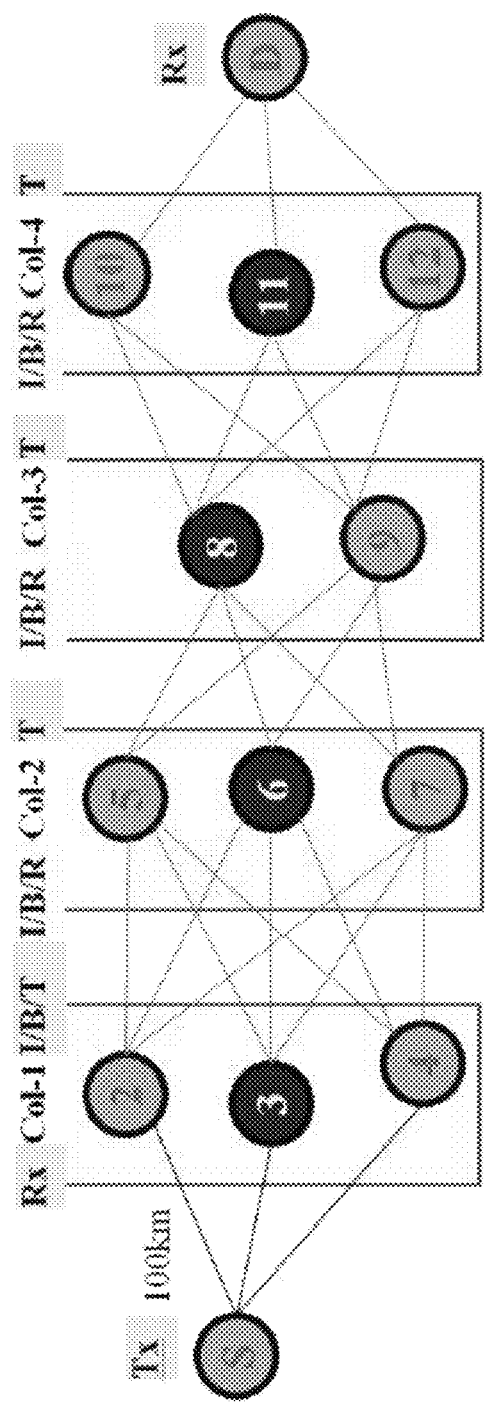
FIG. 5 is an illustration of an exemplary cross-layer MAC/Routing schedule control.

FIG. 5 illustrates cross-layer MAC/Routing schedule control. As shown in FIG. 5, suppose Col-1 nodes are receiving data from S, Col-2 nodes can send data to Col-3, and Col-4 can send to D. The nodes belonging to the same column will have similar transmission delays after traffic is allocated to each link based on the link weights. For example, if S-to-2 link's weight is double of S-to-3 link, double traffic amount can be allocated in S-to-2. Because rateless codes are used that can automatically adjust the sending rate, the S-to-2 link would have approximately double sending rate than S-to-3, thus the transmission delay is approximately the same in those two links. Therefore, all nodes in the same column can be made to achieve a coarse Rx/Tx synchronization. If Col-(i) is receiving data, it cannot send data to Col-(i+1). However, Col-(i+1) can send data to Col-(i+2) at the same time. Thus a pipelined column-by-column transmission is achieved.

The above mentioned TDMA-like MAC layer is important to some $H^2WN$ applications such as airborne networks. Due to the long-distance link, the propagation delay could not be ignored. For example, if a link is 100 km, it is 0:33 ms of delay. For such a 'long' time, it is difficult to accurately detect transmission collisions if CSMA-based MAC scheme is used. To avoid the waste of link bandwidth, some packets could be sent during such a long time. Therefore, some researchers suggest to use TDMA-like scheme to send some packets each time in a Tx phase, and then switch to Rx phase to receive some packets. Since the TDMA slot time is much longer than conventional slot definitions, it cannot be called real TDMA scheme (instead, it is called TDMA-like scheme). Additionally, the time boundaries between Tx/Rx do not need to be accurately determined. In other words, there may exist certain Tx/Rx starting time deviations among different nodes in the same column. Such a situation can be generally referred to as coarse synchronization.

The high-level network may not have such a long link. For example, in a small-size wireless sensor and actuator network, the distance between the actuators may be only 500 m. For this case, in MAC layer, CSMA-based scheme can still be used. A higher MAC sublayer can be added above the CSMA to achieve a coarse TDMA-like Tx/Rx switching control.

In FIG. 5, when Col-1 nodes are receiving data from S by using left half of its beams, the right half of its beams could be in idle (I) status; Or, they could receive data sent in reverse direction (either ACK packets or reverse data sent from the receiver). 'B' (back) is used to mean reverse direction data.

The bandwidth allocation policy is defined as a linear programming problem with certain network and interference constraints. Fence topology is modeled as a directed graph G(V;E). For simplicity, the largest width in the fence routing topology can be assumed to be 3, which means that in each column there exist a main path node and 2 side path nodes (one in each side of the main path). Thus for each node v∈V, there are at most three beams in active Tx or Rx mode. A beam i of node v can be denoted as $v_i \in v$. For any link (u, v)∈E, the flow rate or average throughput is denoted as f(u, v), and $f(u_i, :)$ denotes the outgoing flow rate from beam i of node u; $f(:, v_j)$ denotes the incoming flow rate to beam j of node v. If node v is within the range of beam i in node u, i.e. $v \in R(u_i)$, the flow rate f(u, v) can also be represented as $f(u_i, v)$. Assume there is a lower bound $f_0$ for the flow rate at each beam of the nodes in the fence routing topology. Additionally, radio interference should be considered. The objective for bandwidth allocation is to maximize the overall throughput while minimizing the interference in the network with multi-beam antennas. The LP problem can be formulated as follows:

$$\max \sum_{S_i \in S} f(S_i, :) - IF \quad (4)$$

Subject to $$\sum_{S_i \in S} f(S_i, :) = \sum_{D_j \in D} f(:, D_j). \quad (5)$$

$$f(u_i, :) = f(u, v) \text{ for } v \in R(u_i). \quad (6)$$

$$f(:, v_j) = f(u, v) \text{ for } u \in R(v_j). \quad (7)$$

$$\sum_{A_i \in A} f(A_i, :) = \sum_{A_j \in A} f(:, A_j) \text{ for } A \in M. \quad (8)$$

$$f_0 <= f(u, v) <= C_e \text{ for } (u, v) \in E. \quad (9)$$

-continued $$\text{Size}(B) <= 3 \text{ for } B \in V. \quad (10)$$

$$f(u, v) >= f(u, w) \text{ for } (u, v) \in ME, (u, w) \notin ME. \quad (11)$$

Here, $C_e$ denotes the link capacity, M represents the nodes in the middle of the fence except for source S and destination D. And ME is a link of the main path, which is supposed to have more bandwidth than the links of the side path. Size(B) represents the number of beams in use for node B when B is transmitting or receiving data. IF represents the total interference in the network.

The main operations of the routing protocol among the high-level nodes is provided as follows: Inputs include Node IDs, beam IDs, Channel IDs, Traffic QoS parameters (delay deadlines), link rate and network capacity in each beam, source traffic amount and rate, antenna beam angle, node mobility speed. Outputs include fence routing topology, and Tx/Rx schedule. Part 1 of the routing protocol comprises main/side paths establishment. This includes (1) using the enhanced ORRP algorithm described before to establish a GPS-free main path. (2) Every main path node $h_i$ in stage i widens the path to construct side paths by searching neighbors in both sides of the main path via neighbor discovery scheme. Also, an upper bound $V_{max}$ and lower bound $f_{min}$ are used to rule out the neighbor nodes with low flow rate and high mobility. (3) A side node in current column (also called stage), i, can be included in the neighbor list of the main path node $h_i$, as long as it is in one-hop range of the main path node. Suppose the list size is N. For the desired stage width W (it means that there could be the maximum W nodes in one stage), if N>(W−1), we could select (W−1) side nodes with relatively higher sending rate and lower mobility among all N nodes. If N<(W−1), then the width for this stage needs to be reduced. For example, assume that the desired stage width is 4, however in stage i, there are only 2 side nodes in the list. Then in stage i the width has to be reduced to 3. Therefore there may be different widths for every stage. (4) Building all the stages until reaching the destination node D. Every node in stage (i+1) should be within the communication range of all the nodes in stage i. This is also the reason that we cannot use a too high value of W. Otherwise, a node in stage i may not be able to read a stage (i+1) node in the diagonal direction.

Part 2 of the routing protocol comprises beam orientation adjustment. (5) Based on the four steps above, the stages are constructed to form a fence structure. Then for a MBSA of any node, the beam direction should be adjusted properly to establish the links between the nodes in two consecutive stages. A node A in stage i keeps sending probing messages through its beams to the nodes in stage (i+1), if a node B in stage (i+1) receives the probing message, it sends back an ACK message. Thus the link between A and B is established, and the beam of A stays towards B.

Part 3 of the routing protocol involves beam table maintenance. (6) After the beams' directions are determined in the above step, the beam table will record the node ID within each beam's range. In addition, in the probing ACK message, each node of stage (i+1) feedbacks its information such as node ID, reception beam ID, signal strength, queue size, etc. (7) Each node in stage i also puts its own information into the beam table including the beam ID, desired destination ID, beam range, queue length, traffic QoS, traffic type, traffic priority, etc.

Part 4 of the routing protocol involves traffic control. (8) For any node, all the beams should have coarse time synchronization due to the concurrent packet transmission (CPT) and concurrent packet reception (CPR) requirement for all the beams of a MBSA. Between the stages the transmission (Tx)/reception (Rx) modes alternate, i.e. if stage i is in Tx mode, then stage (i+1) should be in Rx mode, and stage (i+2) should be in Tx again. (9) To be compatible with TDMA-like protocol in MAC layer, the time interval for each Tx/Rx mode should be determined based on the traffic amount in each beam and the link speed. The goal is to ensure that the entire stage has coarse time synchronization.

Part 5 of the routing protocol comprises QoS control. (10) For each node, the links in its beams are assigned different priorities based on the link quality (measured by weights). The links with higher priority are assigned with more traffic amount. (11) To avoid traffic congestion, the nodes in stage (i+1) periodically inform the nodes in stage i about the queue size.

Low-Level Network Routing

While the high-level network has even mobility (i.e. the nodes have similar moving speeds), the low-level network has singular mobility, i.e., the sink node typically has much higher mobility than other nodes. This is mainly due to its global network data collection requirement.

Figure 6:
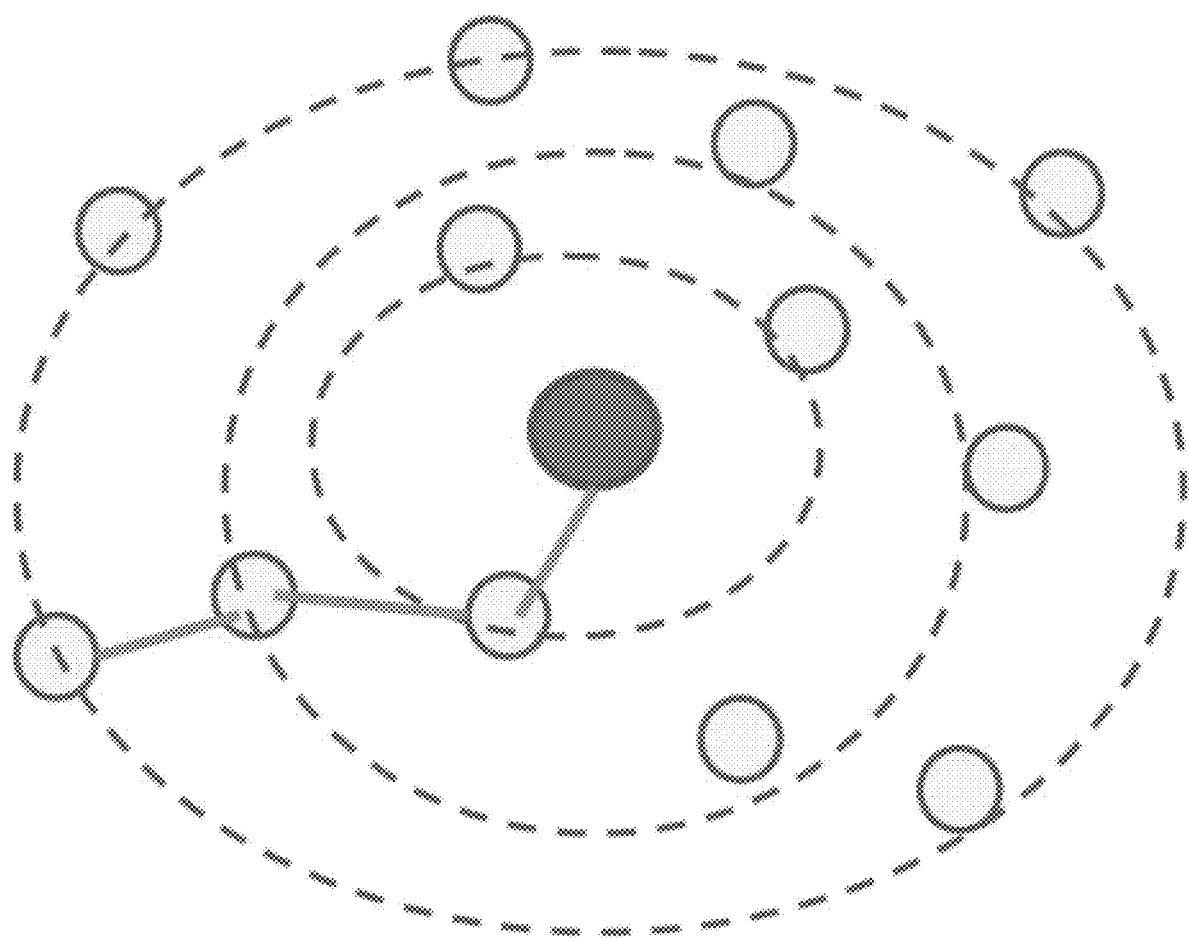
FIG. 6 is an exemplary illustration of gradient routing.

Consider the case that the sink does not have much mobility. A simple gradient routing could well support the node-to-sink communications. As shown in FIG. 6, the sink can simply broadcast an announcement message to the global network in order to know how many hops away each node is. Since the sink does not move much, it only broadcasts such a message occasionally. Then any node can simply forward data to an inner circle neighbor, and eventually reaches the sink. However, if the sink moves much more quickly than other nodes, such a gradient-based routing does not work well since an established gradient map quickly becomes invalid when the sink moves to a new place within a short time. Conventional DSR-like routing cannot efficiently handle singular mobility. Since DSR uses blind, global RREQ broad-casting, a source node needs to frequently broadcast such RREQ messages in order to keep track of the fast moving sink.

Here, a GPS-free network is assumed. Thus, the geographical routing based schemes will not work here either.

A. Moth-Inspired Event-to-Sink Data Delivery

Figure 7:
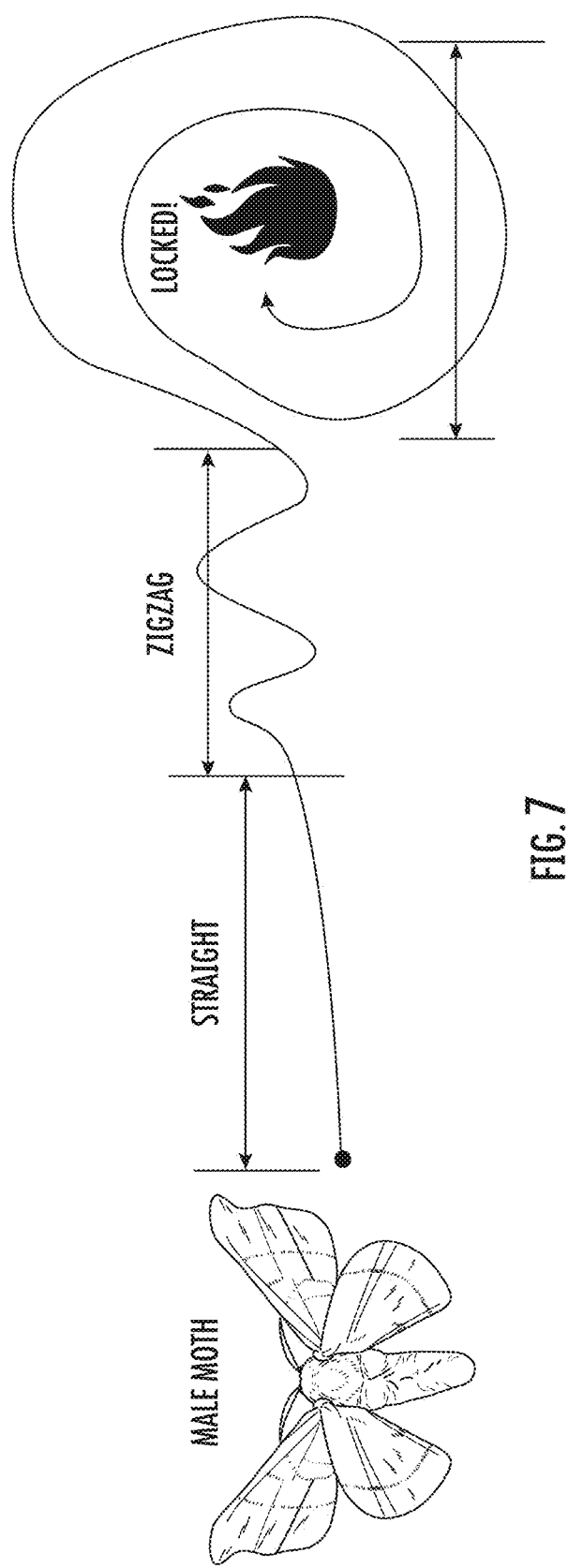
FIG. 7 is an exemplary illustration of moth-inspired event-to-sink data delivery.

A moth has a special way to pursue a light source. It first detects the approximate direction of the light source (it has an acute thermal detection capability to find such a direction). Then it uses three steps to locate the light (see FIG. 7): (1) fast, straight approaching: It first uses a diving speed to quickly approach to the target. (2) Zigzag trajectory: When the moth feels that the target is not far away, it slows down its speed and carefully flies toward the target with the zigzag style. (3) Circular fly to lock the target: When the moth feels that the light source is close enough, it uses a circular trajectory to get closer and closer to the target until finally it locks the exact location. Scientists think that the moth's innate capability is an efficient way to locate a target. Its behavior is similar to a spaceship's flying style: it first uses the highest speed to fast approach to a planet. Then it slows down and flies circularly in the orbit of the planet until landing.

Figure 8:
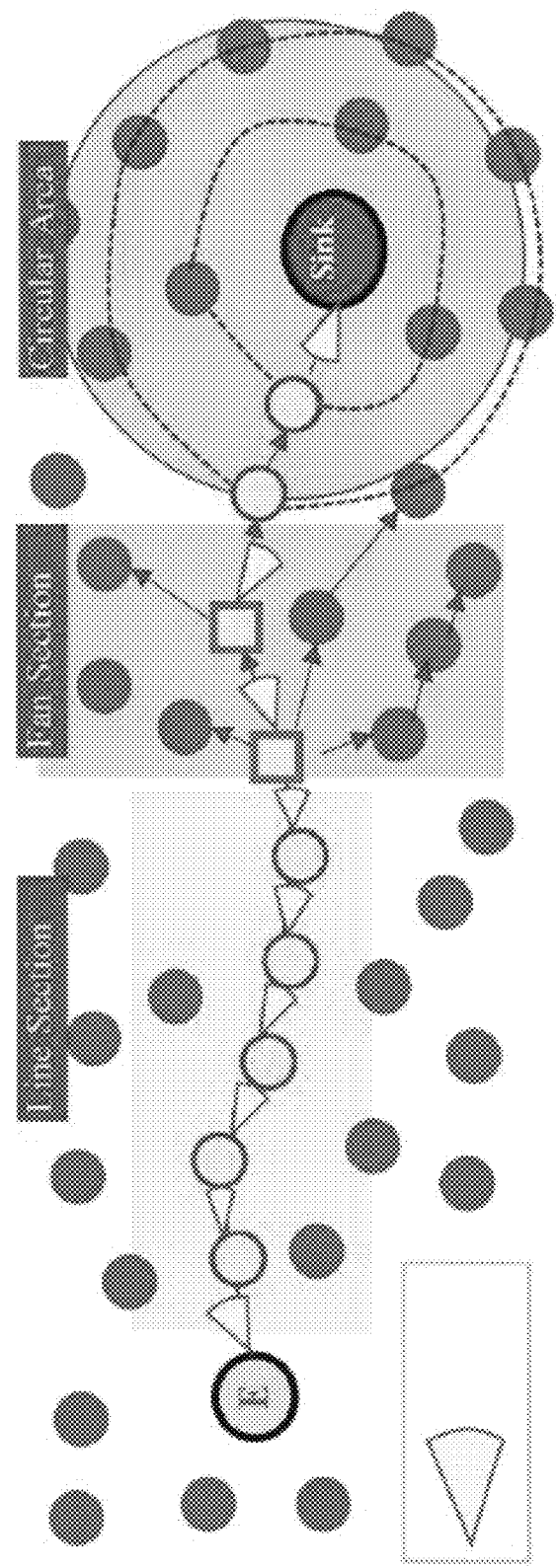
FIG. 8 is an exemplary illustration of a line-fan-circular (LFC) routing path establishment scheme.

Inspired by the above moth's target searching behavior, described herein is a line-fan-circular (LFC) routing path establishment scheme (see FIG. 8). The entire routing path is comprised of 3 parts: (1) Line segment (LS): In this section of path, the event node (E) uses a single path to relay the data in hop-by-hop. (2) Fan segment (FS): In this phase, the last node of the line section uses DSR-like RREQ broadcasting to search for the neighborhood of the sink. (3) Circular area (CA): This is the neighborhood of the sink. When a FS node intersects with any of the CA nodes, it stops FS, and the intersection node uses gradient path to directly reach the sink.

Due to singular mobility, the sink has a quickly changing neighborhood. It is not beneficial to maintain a gradient routing map for the entire network since a node may never reach the sink if following an outdated gradient path. Therefore, the sink is only asked to maintain a very small gradient map (maybe just 2 hops away), see the circular area (CA) of FIG. 8. Suppose a sink moves at speed of 100 meters per second. Assume that it broadcasts a message to its neighborhood every 10 seconds. Since the UAV communication distance can be up to 10 km, the sink only leaves its original location for 1 km within 10 seconds. The CA established last time is thus still valid. Therefore, as long as a packet reaches one of the CA nodes, it can be delivered to the sink.

The radius of a CA (measured as the number of hops) depends on the empirical values of the network settings. If the sink moves faster, it should maintain a smaller CA. Otherwise, it may expand its CA to more hops. Whenever the sink wants to establish a new CA, it will broadcast a CA Fresh message to its neighborhood. There is a field in the header called CA TTL (time-to-live). Suppose it is set to 3. Each time a node receives the CA Fresh, it subtracts 1 from CA TTL. If it is zero, the node knows it is in the outer circle of the CA and stops further broadcasting.

Any node can at least use a part of the DSR-like path to reach the sink. Here we assume that the sink broadcasts the RREQ to the global network at a reasonable rate. After a complete DSR process through the network, all nodes will get to know the approximate gradients to the sink. Especially they will know the shortest path to reach the sink (i.e. along the gradients). Even if the sink quickly moves away, at least the first part of the path will bring the data to the correct direction to the sink. This motivates the use of LS (FIG. 8) to fast approach to the CA. The length of the LS depends on the empirical values. Its value is a trade-off between the following factors: the network scale, how many hops between the source and sink, the sink mobility, and the maximum 1-hop communication distance.

The FS is needed to reach the CA. In the moth's trajectory, there is a zigzag section between LS and CA. Here a short section of fan-like message broadcasting is used in the FS section to search the CA. As long as the message reaches a node of the CA, the node immediately sends back a CA FOUND message to the source.

Such a FS is very short compared to the LS. If LS is updated due to a new round of global DSR process launched by the sink, the corresponding FS path should be re-built. If the intersection node (with the CA) is not available anymore due to the sink's new CA announcement, the FS should also be updated to find a new intersection node.

A moth-inspired routing algorithm has inputs that comprise node IDs, average node mobility Vs, sink mobility Vd, sink announcement round ID # NL, sink announcement period Td, link capacity LC and rate LR, source traffic rate RS, radio reaching range R, LS hop number # M1; and has an output that comprises moth-inspired routing topology.

The sink periodically broadcasts its information such as the current location and node ID to the network, by using DSR protocol (or other reactive ad hoc routing schemes). The nodes receiving the sink's message update their neighbor lists and routing tables to build the gradient routing paths. Those nodes use gradient routes to connect with the sink in the CA.

The whole routing path is partitioned into three sections (LS, FS, and CA). In LS, the hop number # M1 depends on node mobility rates Vs, Vd. The nodes within the first M1 hops starting from source node are selected from the DSR-based path to form the LS. The end node A in LS is also regarded as the starting node of the FS. Node A uses blind message broadcasting to searches for the target nodes B1, B2, . . . , Bn located in CA. One of the target nodes Bi is chosen as the intersection node between FS and CA, if the path from A to Bi is the shortest among all the paths originated from A. By using gradient routing, node Bi can reach the sink with singular mobility. Every T1 seconds, the sink broad-casts a Location Update message to nearby nodes (within M hops), to build a new CA. If the target node Bi is not in the new CA anymore, a new search of FS needs to begin to a find a new target node Bj. Every T2 seconds (T2>T1), the source triggers a new round of DSR to establish a new LS.

B. Ant-Inspired Cross-Level Routing

Although the sink could serve as the data aggregation point to collect event data from any low-level node, in many $H^2$WNs, one of the high-level nodes (called commander node), plays a more critical role than the sink since it can send commands to any low-level node (using downlink communications). It also collects emergency reports from any low-level node (using uplink communications).

Figure 9:
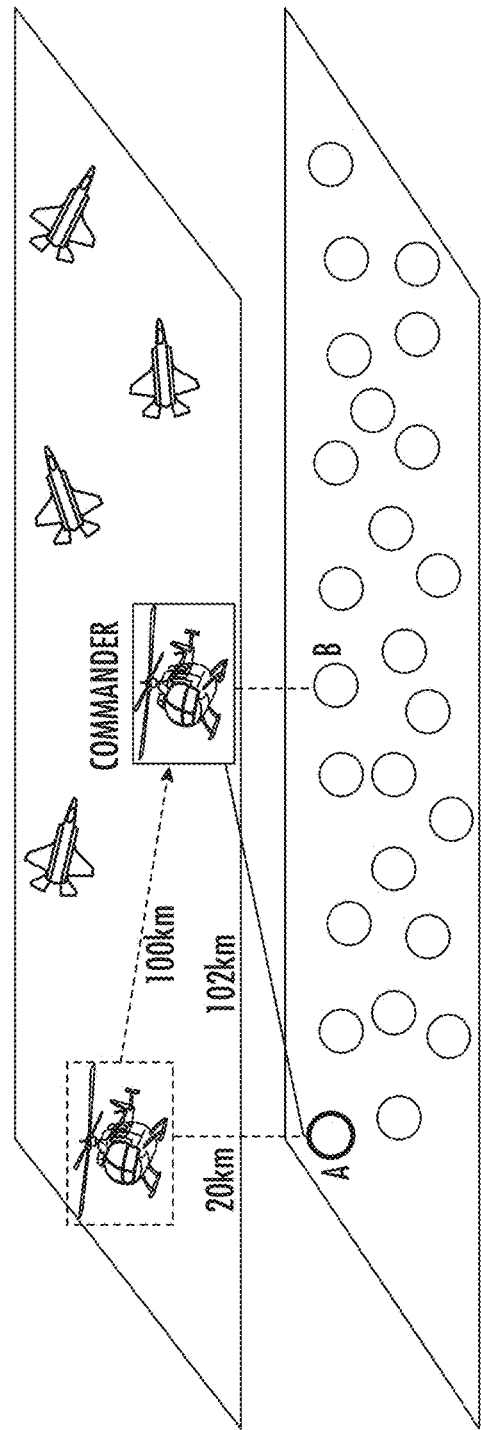
FIG. 9 is an illustration of conventional UAV-to-commander cross-level communication.

Although downlink communication (commander-to-UAV) is relatively easier due to the powerful long-distance communication capability of the aircrafts, the uplink communication (UAV-to-commander) needs to adopt the principle of "the closer, the better" to save the transmitter's power. This is because an UAV is designed to communicate within a short-distance link (<10 km). It needs to use a high antenna power to reach a high-level node. Therefore, if it needs to talk with the commander, it must first forward the data to a UAV that is closest to the commander, and then asks that UAV to relay the data to the commander. FIG. 9 shows such a scenario. Suppose a low-level node A wants to send data to a commander. Assume in the beginning it can send signals to the commander that is right above it (20 km away). Then the commander moves away for 100 km. Now A needs to propagate the signal for a much longer distance (this example is 102 km). Obviously, this is not realistic to a UAV with limited antenna power. A better approach is to use a node that is closest to the commander (here it is node B), to help to relay the data to the commander. Therefore, always finding a closest node plays a critical role in UAV-to-commander uplink communications. Herein, a cross-level routing scheme is described that can not only ensure the shortest uplink distance, but also record the commander's latest locations (thus we can always keep track of the commander's moving trajectory).

Figure 10:
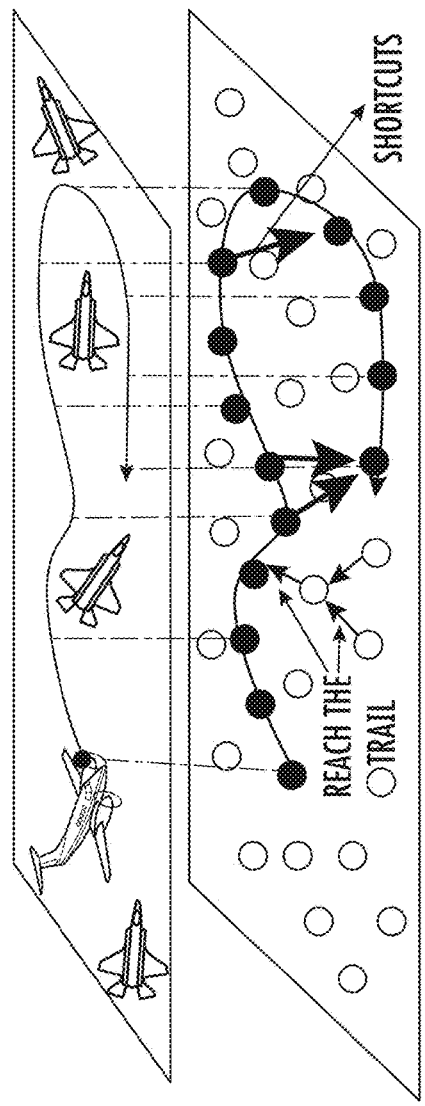
FIG. 10 is an illustration of the basic idea of ant-inspired cross-level routing.

Ants have the innate capability to collaborate to find food. When an ant finds a food source, it gets back to the nest and leaves a special chemical material called pheromone. Other ants will follow such a trail to reach the food source. When more and more ants follow the same trail, each of them leaves certain amount of pheromone trail, and thus such a trail is enhanced. If the food is already stored in the nest, the pheromone evaporates and eventually disappears. Then no ant will follow such a trail any more. Inspired by the pheromone trail phenomenon, the low-level nodes are used to record the trail of the commander node of the high-level network. This idea is motivated by the following: (1) the low-level network is much denser than the high-level network. So, many swarming UAVs can well record the trajectory of an aircraft. (2) The high-level node can easily reach the low-level node through its powerful antenna (a MBSA). Each time the commander moves, it can broadcast a TRAIL message to the low-level network. Any node receiving such a message will keep a record in its commander tracking table. FIG. 10 illustrates the basic idea—each trail node maintains a table containing beam direction, decaying factor, trail timestamp, next-node, etc.

An ant-inspired cross-level routing protocol comprises inputs including node IDs, link rate RU on the upper layer, link rate on the lower layer RL, antenna signal range R, the shortest distance between the low- and high-level network h, commander announcement period TP; and has outputs that comprise a trail list in the lower level, and a cross-level routing path. In step 1 of the protocol, the commander node Nc periodically sends the TrailNotification message with its ID and timestamp to the nodes in the lower layer. If a node Li in the lower layer receives the message from the commander node, then it creates a trail table to store the information including timestamp, last trail node ID, etc. Also, node Li periodically broadcasts the trail table to its neighbors in the lower layer. Any node that hears the broadcasted trail table and is in the trail will add a "shortcut pointer" to its trail table to indicate that it can directly reach the ending node in the trail. At step 2 of the protocol, if a node in the trail wants to send data to the commander node, it will first search "shortcut pointer". If the pointer exists, it will immediately forward data to the ending node in the trail. Otherwise, it initiates a route discovery to find a closest trail node. It does this by following general DSR process: it broadcasts a RREQ message to nearby nodes. If a node that received the RREQ and is in the trail, it feedbacks the FoundTrail message to the source. At step 3 of the protocol, decaying of the trail, if a node finds itself has not received the new TrailNotification message for a duration that is longer than a preset threshold Ttrail, it sends out a LeavingTrail message to nearby trail nodes, and leaves the trail.

Transport Layer Protocol and Congestion Control

To achieve both reliability and congestion control for the multi-beam multi-path networks, disclosed is a network coding scheme, called Adaptive Batch Coding (ABC). A special batch code is employed to resist general congestion situations or random packet loss, i.e., to allow the communication entities to transmit messages successfully without retransmissions when the congestion is not severe or there are just some random loss events due to link errors. The disclosed ABC scheme can adaptively adjust the coding batch size. Thus, the coding rate can change according to the path quality. When the congestion is severe, while conventional network coding based transport schemes totally abandon the retransmissions, we have found that proper retransmissions of the lost, coded packet symbols can efficiently relieve the congestion severity.

Wireless link quality varies from time to time. The disclosed ABC scheme first estimates the path quality based on the data collected from the network layer, and determines the coding rate (it is the ratio between the amount of the original packets and the amount of the encoded pieces). According to the coding rate, the redundant symbols are generated through a bit-wise exclusive-OR operation upon the original data. Once the batch coding is finished, the source sends all of the symbols to the main path as well as the side paths. Each node, including the source and the intermediate nodes, collects the transmission quality of all of its outgoing links, and allocates certain amount of traffic according to the link quality.

Figure 11:
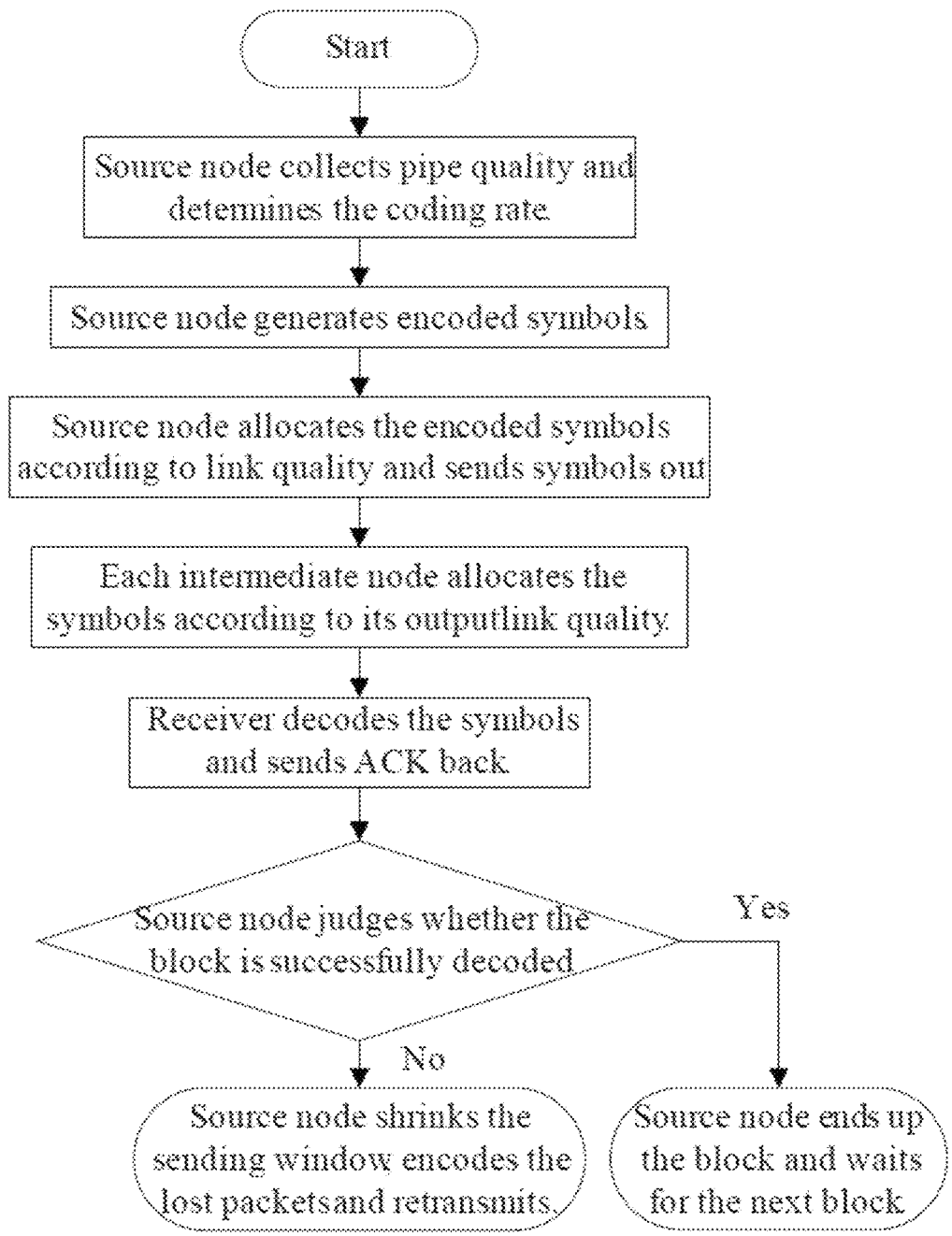
FIG. 11 is a flowchart illustrating an overview of the overview of the disclosed ABC scheme used for congestion control.

The decoder at the receiver shares the same generator matrix with the encoder at the sender. For each coded block (batch), if the received symbols are sufficient enough for decoding, the decoder can retrieve all of the original packets successfully. Note that the decoder does not necessarily wait for all of the encoded symbols (in the same batch) to arrive due to the use of redundancy coding. However, if there are many lost symbols that make the received symbols not able to retrieve all of the original packets, a Negative Acknowledgement (NACK) will be sent back to the source, indicating the IDs of the lost packets. The source then shrinks the batch size, encodes the lost packets, and retransmits them. An overview of the disclosed ABC scheme is shown as a flowchart in FIG. 11.

The disclosed ABC scheme encodes a batch of original packets via bit-wise exclusive-OR operations and generates the encoded symbols. The symbols carry certain amount of redundancy to resist the packet loss. Assuming that the original message batch with k packets is $M=[m1, m2, \ldots, mk]$, and each packet contains h bits, then, a (n, k) batch encoder generates the encoded block C through the following computation:

$$C = G*M = \begin{bmatrix} g_{11} & g_{12} & \cdots & g_{1k} \\ g_{21} & g_{22} & \cdots & g_{2k} \\ \vdots & \vdots & \ddots & \vdots \\ g_{n1} & g_{n2} & \cdots & g_{nk} \end{bmatrix} * \begin{bmatrix} m_1 \\ m_2 \\ \vdots \\ m_k \end{bmatrix} = \begin{bmatrix} c_1 \\ c_2 \\ \vdots \\ c_n \end{bmatrix} \quad (12)$$

where G is a pre-defined generator matrix, $g_{ij} \in [0, 1]$, and $c_i$ is the encoded symbol with a size of h bits ($i \in [1, 2, \ldots, n]$, $j \in [1, 2, \ldots, k]$). The coding rate is $r=k/n$.

To provide reliability in the transport layer, a popular method is to use retransmissions. However, the multi-hop transmission accumulates the packet errors (as an example, after passing L hops with a link error rate of p, the probability of successfully receiving a packet in the last node is only $(1-p)L$). Meanwhile, the multi-path transmission also aggravates the out-of-order problem, since the link quality of side paths deteriorates from time to time more easily than the main path, and the packets may undergo longer queuing delay at the side-path nodes than at the main-path nodes. As a consequence, for an absent packet, the receiver may need a longer time to determine whether the packet is lost or delayed. This also increases the in-order packet assembly time.

Based on the above analysis, adding slight redundancy to resist random loss is beneficial in multi-path networks. However, when severe congestion occurs, adding too much redundancy may aggravate congestion for the already overwhelmed queues. The disclosed batch coding scheme uses three features to overcome this issue: A systemic coding method is adopted for fast decoding, which significantly reduces the computational complexity and decoding delay. The amount of redundancy is generally low, and the coding rate is dynamically adjusted according to the path quality. Apparently, more redundancy is need when the routing pipes congestion is severe or the random link loss rate is high. The generation of the redundancy is based on the routing characteristics and path quality (details later).

In the disclosed ABC scheme, the code generator matrix is defined as follows:

$$G = \begin{bmatrix} I_k \\ G_{1 \times k}^o \\ G_{l \times k}^p \end{bmatrix} = \begin{bmatrix} 1 & 0 & \ldots & 0 \\ 0 & 1 & \ldots & 0 \\ \cdot & \cdot & & \cdot \\ \cdot & \cdot & & \cdot \\ \cdot & \cdot & & \cdot \\ 0 & 0 & \ldots & 1 \\ \hline 1 & 1 & \ldots & 1 \\ \hline g_{11} & g_{12} & \ldots & g_{1k} \\ g_{21} & g_{22} & \ldots & g_{2k} \\ \cdot & \cdot & & \cdot \\ \cdot & \cdot & & \cdot \\ \cdot & \cdot & & \cdot \\ g_{l1} & g_{l2} & \ldots & g_{lk} \end{bmatrix} \quad (13)$$

The generator matrix of the proposed ABC scheme is composed of three parts: 1) an identical matrix Ik, with a size of k×k; 2) an overall checking submatrix $G_{1 \times k}^o$, which is a 1×k all-one vector. The checking submatrix generates slight redundancy to provide protection against the light congestion or random loss in a batch; and 3) the partial checking submatrix $G_{l \times k}^p$, which is optional and has a size of l×k. The pattern of $G_{l \times k}$ is related to routing characteristics and is designed in such a way that the symbols travelling through poor paths can provide extra protections.

Note that the generator matrix G is pre-defined, and is preshared between the sender and receiver. The encoded symbols obtained by (12) can be represented as follows:

$$C = [C^s \ C^o \ C^p] \quad (14)$$
$$= [c_1^s \ c_2^s \ \ldots \ c_k^s \ c_1^o \ c_1^p \ c_2^p \ \ldots \ c_l^p]$$

1238eishnd'lkc
There are three parts in the encoded block C: The first part, $C^s$, represents the systemic symbols, with a size equal to the original packets in a batch, i.e., $c_i^s = m_i$ (i=1, 2, . . . , k). A systemic coding strategy decreases the decoding complexity, which is important in the computation-limited applications. If no congestion happens, sending systemic symbols helps to reduce the decoding delay, since the decoder can avoid the waiting of the redundancy symbols and submit the original packets to the upper layer immediately. The second part has the overall checking symbols (OCS). For simplicity we use only one symbol, i.e., $c_1^o$ co=$m_1 \oplus m_2 \oplus \ldots \oplus m_k$, where $\oplus$ is the bit-wise exclusive-OR operation. Apparently, the OCS can resist single packet loss within a batch. In light congestion conditions, this can recover the lost/damaged symbols very well. In the disclosed ABC scheme, the OCS is mandatory to be employed. The last part of the encoded block is the partial checking symbols (PCS). The PCSs are optional, and are obtained by the bit-wise exclusive-OR operations on the original packets. Sophisticatedly designed $G_{l \times k}^p$ can efficiently improve the transmission performance. The link qualities of the main path and the side paths will be collected from the routing layer. If the side paths yield poor quality, more redundancy will be added to the packets travelling through the side paths to resist packet loss.

Here a Ripple-Diamond-Chain (RDC) routing topology (see US patent publication 20170105163, published Apr. 13, 2017, which is fully incorporated by reference for more information on a RDC topology) as an example. Assuming that the side paths undertake ⅓ traffic approximately, the generator matrix for 4 raw packets in a batch can be designed as:

$$G = \begin{bmatrix} 1 & 0 & 0 & 0 \\ 0 & 1 & 0 & 0 \\ 0 & 0 & 1 & 0 \\ 0 & 0 & 0 & 1 \\ \hline 1 & 1 & 1 & 1 \\ \hline 0 & 0 & 1 & 1 \end{bmatrix} \quad (15)$$

Thus, the encoded symbols are C=[$c_1^s$, $c_2^s$, $c_3^s$, $c_4^s$, $c_1^o$, $c_1^p$,], where the OCS is $c_1^o = m_1 \oplus m_2 \oplus m_3 \oplus m_4$, and the PCS is $c_1^p = m_3 \oplus m_4$. If the segments $m_1$ and $m_2$ travel through the main path, and $m_3$ and $m_4$ travel through the side paths, then the PCS $c_1^p$ provides extra protection for the side path symbols. Once the encoding is finished, each of the encoded symbols is assigned a unique ID number, and is dispatched through the main/side paths.

Although a well-designed transport protocol can improve the network throughput, the lower layers must support high-capacity communications, in other words, an efficient transport scheme must be based on a high-throughput routing protocol. This is because that the transport layer can only achieve the maximum throughput that the routing layer is able to provide. This is the main motivation of using cross-layer design (across transport/routing layers) in our work.

As disclosed herein, a directional network with MBSAs is used. Ideally, the v beams of each node may be regarded as v 'virtual wires' that can potentially enlarge the node capacity for v times, compared to the omnidirectional antenna case. Conventional routing schemes, e.g., dynamic source routing (DSR), use at most one or two beams of the MBSA, and thus cannot utilize MBSA's benefit. A natural solution to form a MBSA-oriented routing is to use a pipe to deliver packets in a thicker path (i.e., pipe routing). The nodes in the pipe collaborate with each other to form a high-throughput, smooth pipe stream, by using a multi-beam-based cooperative transmissions. If the nodes have the same number of hops from the source, they are said to be in the same stage. The entire routing pipe may comprise multiple stages from the source to the destination. The i-th stage nodes can use multiple beams to communicate with the nodes in the (i+1)-th stage. Due to the signal separation among the beams, there is no radio interference among the beams.

Fence routing, as disclosed herein and further described in L. Hu, F. Hu, "Bio-inspired Fence Routing for Multi-Beam Smart Antennas," IEEE Transactions on Mobile Computing, 2016, which is fully incorporated by reference. Fence routing has a grid structure. Each stage can have multiple nodes, and each beam has a weight value that measures the link quality in that beam/direction. Suppose a node has 4 beams, then just 3 nodes are needed in each stage to make full use of the communication capacity of the MBSAs (one of the 4 beams is used to receive data from an upstream node). Note that for a MBSA, each beam could fast steer itself to different directions based on the communication needs.

Figure 12:
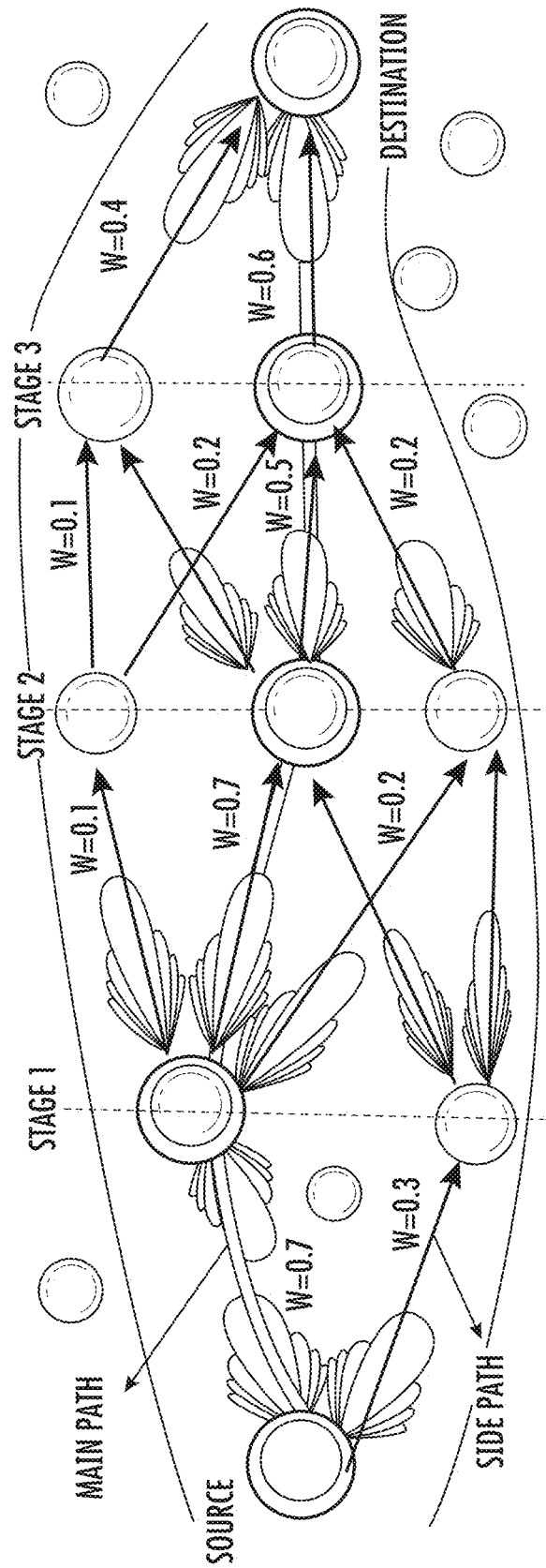
FIG. 12 is an illustration of pipe-shaped data forwarding architecture that uses multi-beam antennas to concurrently communicate with multiple nodes.

The disclosed ABC scheme is based on the MBSA-oriented fence routing topology, as shown in FIG. 12. There is a main path in the routing pipe, which comprises high-quality links and defines the trajectory of the entire pipe. As disclosed and described in L. Hu, F. Hu, "Bio-inspired Fence Routing for Multi-Beam Smart Antennas," IEEE Transactions on Mobile Computing, 2016, a reinforcement learning algorithm can be used to establish the main path. To maintain a fence routing topology, each node keeps a beam table that includes parameters such as beam channel ID, delay requirements, link distance, QoS requirements, traffic profile, link conditions, beam directions, queue status, etc. It also indicates the communication quality of each link, which can be used to determine the coding parameters of the ABC scheme.

The disclosed fence routing topology fits ABC-based congestion control very well. As mentioned before, the most important thing for multi-beam congestion control is to achieve a smooth pipe streaming between the stages because a bottleneck location can have fast data accumulations in the queue which eventually leads to congestion loss.

As disclosed herein, three strategies can be used for congestion response: (1) ABC batch size control: The batch size i.e., the number of raw packets in each batch (a batch is a coding window), is automatically adjusted based on the upper bound of the throughput (when the 'pipe' is full) as well as the congestion state; (2) Retransmission of decoding failure packets: If the lost symbols are due to serious congestion (or from other network losses) and the receiver fails to decode the entire batch, it sends back a NACK. The sender then shrinks the batch size upon the NACK, and retransmits the decoding-failure packets; and (3) Multi-beam Traffic allocation: Each node allocates a proper amount of traffic to each beam (based on the beam table parameters) for fast, fair data dispatching.

The disclosed ABC scheme controls the data transmission in a duration-based pattern. Such a scheduled MAC layer well fits the concurrent communication requirements of MBSAs, which require that all beams should switch to transmission (Tx) or reception (Rx) at almost the same time. Assuming that the source node generates N packets per second, and a Standard Window Size (SWS), b, is pre-selected in the ABC scheme. Then, the time duration unit (also called time slot length) is T=b/N, which means that a coding block in a window (i.e., a batch), will be sent out within T seconds. Note that the window/batch time duration is proportional to the SWS—the more packets we packed in a batch, the longer duration the window would have. This is different from TCP scheme where the window time duration does not have the relation with the number of packets in a window. (TCP window duration is always equal to a round trip time (RTT)). In our ABC scheme, to determine the values of batch size k and the block size n, two factors should be considered: 1) Coding Rate: Since the aim of redundant coding is to resist the random loss of the symbols, the coding rate r should be proportional to the rate of the loss occurrences. Assuming that there are Q different paths from the source to the destination, and for the i-th path, the symbol loss rate of the j-th stage is $e_{i,j}^s$. Then the loss rate of the i-th path is $$e_i^R = -\prod_{j=1}^{D} (1 - e_{i,j}^S), \quad (16)$$

where $i \in [1, 2, \ldots, Q]$, and D is the number of stages from the source to the destination. Then the coding rate is chosen as:

$$r = \gamma \times [1 - \max(e_1^R, e_2^R, \ldots, e_Q^R)], \quad (17)$$

where $\gamma$ is defined as the risk factor. If a conservative transmission strategy is expected, i.e., a stronger loss-resistance capability is needed, a smaller $\gamma$ may be chosen. According to (17), a smaller $\gamma$ yields a lower coding rate, which means that less raw packets and more redundancy are included in a coding block. On the contrary, if an aggressive transmission strategy is needed, a larger $\gamma$ may be adopted to send more packets (with the price of less loss-resistance capability).

Since the bandwidth of each link/beam changes with time, the capacity of the entire pipe varies. Thus, the amount of data sent in each batch by the source should be dynamically adjusted according to the pipe capacity. To achieve this goal, the disclosed ABC scheme uses the coding block size as the window/batch size. For the i-th time slot, the source node collects the bandwidth of each stage, and computes the capacity evaluation factor of the entire pipe as follows:

$$\kappa_i = \frac{\min(C_1^i, C_2^i, \cdots, C_D^i)}{C_E}, \quad (18)$$

where $C_j^i$ is the bandwidth of the j-th stage in the i-th time slot, and $C_E$ is the bandwidth for the entire pipe ($j \in [1, 2, \ldots, D]$). They can be computed as:

$$C_j^i = \sum_{l=1}^{L} C_{j,l}^i,$$

$$C_E = \frac{\sum_{i=1}^{i-1} \min(C_1^i, C_2^i, \cdots, C_D^i)}{i - 1},$$

Where $C_{j,l}^i$ is the bandwidth of the l-th link of the j-th stage at the i-th time slot. Then, the recommended window size of the i-th time slot, $w'_i$, is computed as:

$$w'_i = k_i b \quad (19)$$

where b is the SWS.

If there is no NACK, the real window size, $w_i$, is equal to the recommended window size, i.e., $w_i = w'_i$. Therefore, for the i-th time slot, the number of raw packets that are actually encoded into a block is $w_i$, i.e., the sender takes $w_i$ original packets and generates $$\frac{1 - r_i}{r_i} w_i$$

redundant symbols, then sends all $$\frac{w_i}{r_i}$$

symbols within a time slot of T. This strategy allows the sender to dynamically adjust the sending rate according to the variations of the pipe's capacity.

The redundancy in each batch is good for loss resistance un-der mild congestion conditions. If a severe congestion happens in the pipe, there might be many missing (encoded) symbols belonging to the same batch, such that the receiver cannot successfully decode them even with the added redundancy. In this situation, the lost packets will be retransmitted. As can be seen, unlike conventional, network-coding-based congestion control that totally abandons the retransmission scheme, in the disclosed scheme TCP's retransmission is maintained in case the coding itself cannot retrieve the lost packets. As a matter of fact, if the retransmissions are not used at all and just reply on the network coding itself to try to recover the encoding-failure data, the sender may just end up with sending more encoded symbols in each batch, which will eventually aggravate the congestion situation.

Therefore, with a proper retransmission of the encoding-failure symbols under severe congestion conditions, the disclosed transport layer scheme makes a good balance between conservative TCP and aggressive network-coding-based transport scheme.

Further in regard to retransmissions, it is more efficient to use a Negative ACK (NACK) instead of ACK since most encoded symbols can be successfully retrieved by the receiver. If sufficient symbols (not necessarily all of the symbols in a particular batch) are received, the receiver begins to decode, submits the assembled packets to the application layer, and ignores the late arrived symbols of the block. However, if the receiver is unable to collect enough symbols for a successful decoding within a time limit, a NACK will be sent back to the sender to indicate the IDs of the undecodable packets. To improve the feedback efficiency, the NACK packets travel through the main path instead of side paths. Note that the NACK packets are tiny (<100 bytes), and can be easily piggybacked in any reverse traffic.

Once a NACK is received, two operations will be performed in the sender: a) The sender encodes the lost packets as a single block and retransmits it; and b) the window size will be shrunken upon a NACK. Unlike the random symbol loss which can be easily remedied by the redundant information, a NACK feedback indicates serious network congestion.

Assuming that there are p packets to be retransmitted, the sender encodes those p packets into a new coding block, and postpones the retransmission for γ times of the batch time, where γ is defined as the Congestion Adjustment Factor (CAF). The reason of holding the retransmission for a short time is to give the network some time to clear up the queues in the bottleneck nodes, thus efficiently relieving the congestion situation. Note that the CAF can be less than 1, which means that the sender waits for less than one window/batch time before retransmitting the lost packets.

After finishing the retransmissions, the sender increases the window size quickly until reaching the recommended window size computed by (19). Assuming that a NACK claiming p lost packets is received by the sender at the j-th time slot, the window size of the i-th time slot, $w_i$, is determined by the following equation (i=1, 2, . . . , j, j+1, . . . ):

$$w_i = \begin{cases} w'_i, & \text{for } i \le j \\ 0, & \text{for } j < i < j + \lambda T \\ p, & \text{for } i = j + \lambda T + 1 \\ \min(2w_{i-1}, w'_i), & \text{for } i > j + \lambda T + 1 \end{cases} \quad (20)$$

Figure 13:
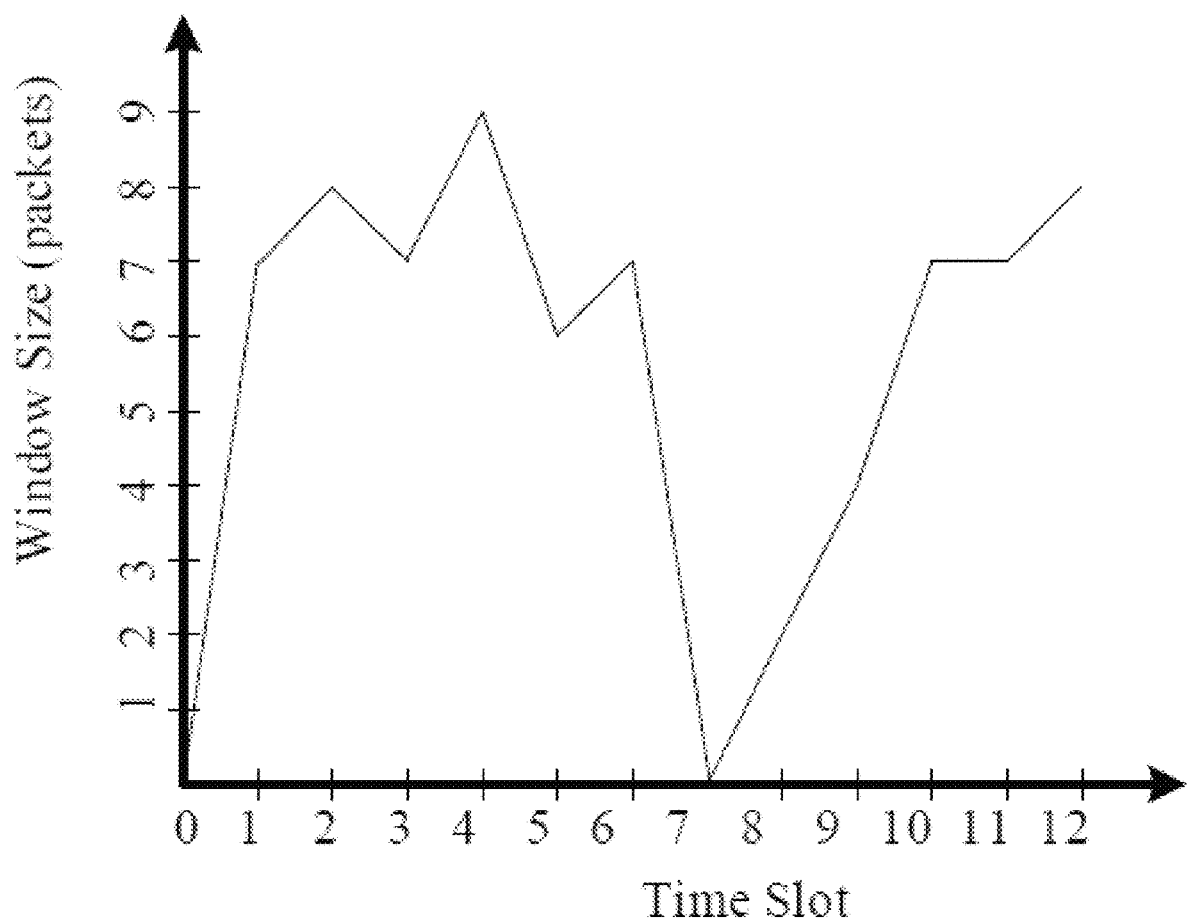
FIG. 13 is an illustration of exemplary window size variation.

FIG. 13 is used to exemplify a scenario of window size variations, for which the CAF λ=1. It is assumed that there is no NACK in the first 6 batches. For simplicity, the time duration of a batch is called a time slot. The window size computed by (19) is 7, 8, 7, 9, 6, 7 packets, respectively. Assuming a NACK claiming two lost packets is received by the sender during the 6th time slot. Thus, the window size of the 7th batch is decreased to 0. Following that, the two lost packets are retransmitted in the 8th time slot, i.e., $w_8$=2. Assuming that the recommended block sizes from 9th to 12th time slots are 7, 7, 7, and 8, respectively. Then, the actual window sizes for 9th to 12th time slots are: $w_9$=min(4, 7)=4, $w_{10}$=min(8, 7)=7, $w_{11}$=min(14, 7)=7, $w_{12}$=min(14, 8)=8, respectively.

It is desired to keep the entire multi-beam routing pipe in a smooth status in order to avoid traffic accumulation in any particular stage or bottleneck nodes. The traffic allocation plays a critical role here. As an example, as shown in FIG. 12, suppose traffic is evenly distributed to each beam without considering the link quality differences, the following con-sequences could occur: (1) Not able to utilize MBSA's CPT/CPR advantages: One of the most advantageous features of MBSA is to use CPT/CPR for concurrent transmissions in all beams. If one beam finishes transmissions too early, it will sit there doing nothing (thus wasting bandwidth); if it finishes transmissions too late, it drags behind the entire node's schedule, since other beams are waiting for the slow beam (thus cannot change mode (Tx/Rx)). Therefore, the traffic amount in each beam should be proportional to its link capacity. In this way, all beams of the same node will finish transmissions at almost the same time. (2) Causing congestion bottleneck(s): If the stage-to-stage traffic load is not allocated properly, some nodes may have too much data waiting in their queues. Thus those stages will become congestion bottlenecks. It is important to guarantee that each stage can timely clear up its queues. Inter-stage traffic allocation can even the queue sizes among nodes to avoid bottlenecks.

In some known multi-beam routing schemes, including RDC and the fence schemes, the main path has good transmission quality, i.e., high bandwidth and low error rate, while the transmission quality of the side paths varies significantly. Each node, including the sender and all intermediate nodes, allocates the symbols among all of its outlet links according to a capacity-and-reliability criterion, i.e., the symbols are dispatched according to the outlets' transmission capacity and link error rate.

First, each node collects path quality parameters from all of its outgoing links, including 1) the path type (main path or side path); 2) bit error rate of the link, e; and 3) link bandwidth, W. All the information can be collected from the routing layer protocol. Meanwhile, each node records the time that an outgoing link finished the transmission of the last symbol. Using such information, the time that the next symbol could be sent through the same link can be computed. The time that the i-th symbol will finish transmission via the p-th outgoing link, $t_{i,p}$, is:

$$t_{i,p} = t_{i-1,p} + \frac{B}{W_p} \quad (21)$$

where $t_i-1$, p is the time when the (i−1)-th symbol was delivered through the p-th link, B is the packet size, and $W_p$ is the data rate of the p-th link. Here p∈[1, 2, . . . , P], and P is the quantity of the outgoing links.

For symbol i, the best outgoing link $L_i^{opti}$ is the one that yields the minimum transmission time, i.e.:

$$L_i^{opti} = L_{i,j} \ni t_{i,j} = \min(t_{i,1}, t_{i,2}, \ldots, t_{i,P}) \quad (22)$$

The symbols are allocated by each node based on the quality of the nodes' outgoing links. In addition, the following rules should also be followed when allocating traffic: 1) the checking submatrix information should always travel through the main path since they are the skeleton keys for the retrieval of all (or partial) original packets. 2) If the error rate of an outgoing link is larger than the coding rate r, the link is marked as invalid, and no symbol will be allocated to that link. This is mainly because that an error rate higher than the coding rate could cause decoding failure.

Figure 14:
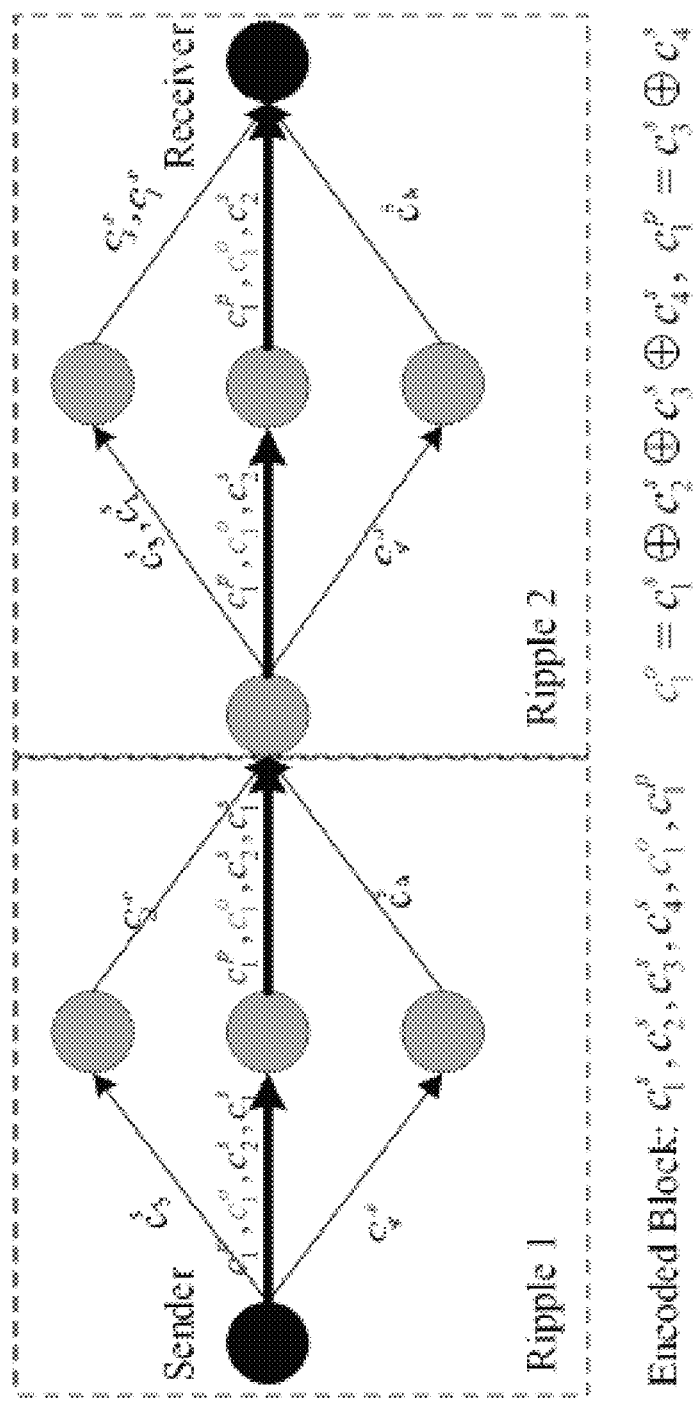
FIG. 14 shows an example of traffic allocation on a two-ripple RDC scheme.

FIG. 14 shows an example of traffic allocation on a 2-ripple RDC scheme. Assume that in ripple 1, two side paths undertake 30% payload; while in ripple 2, two side paths undertake 50% payload. The generator matrix of equation (15) is adopted, and the traffic allocation is shown in FIG. 13. The PCP packet, $c_1^P = c_3^s \otimes c_4^s$, provides extra protection for the side path symbols, $c_3^s$ and $c_4^s$.

Figure 15:
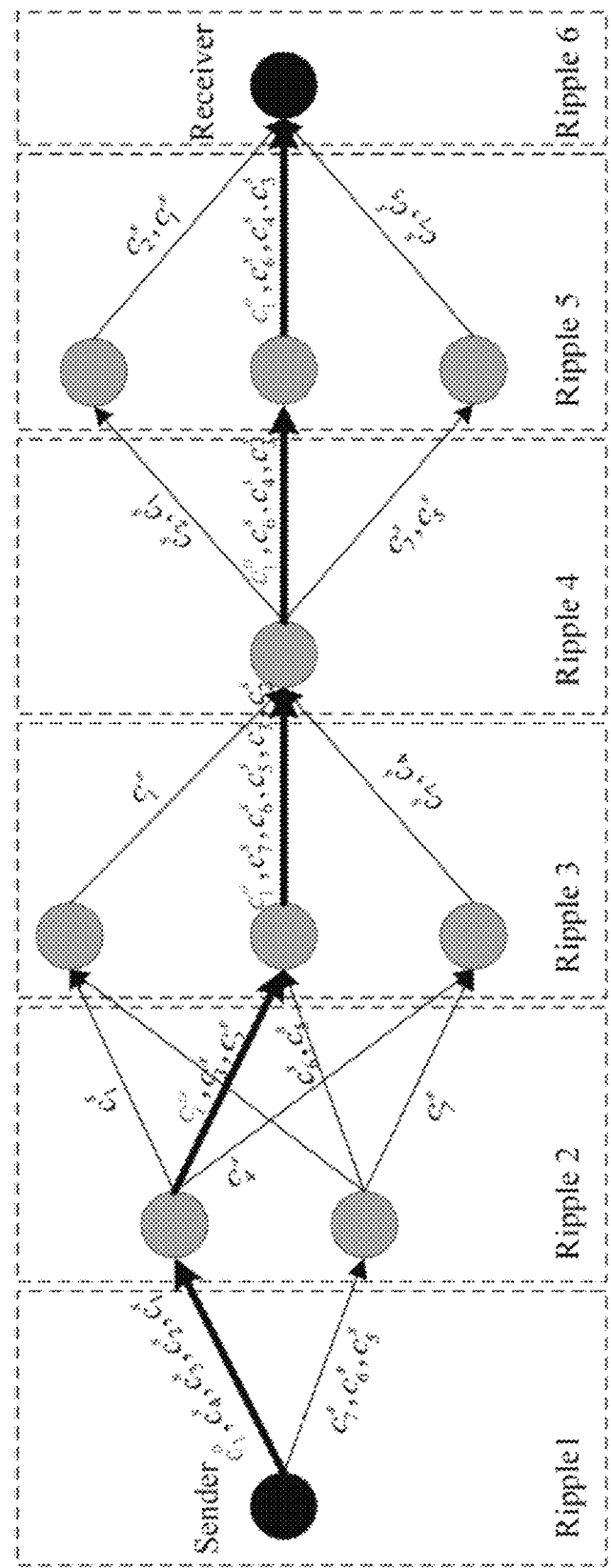
FIG. 15 shows an example of traffic allocation upon a fence topology.

FIG. 15 shows the case with 6-stage fence routing topology. Assume that the link quality significantly varies from stage to stage. Then only the OCP is adopted and no PCP is used in the scheme. FIG. 14 shows a scenario with the block size of 7. Note that the OCP always travels through the main path, while the systemic symbols are dynamically allocated by each node.

Computing Environment

Figure 16:
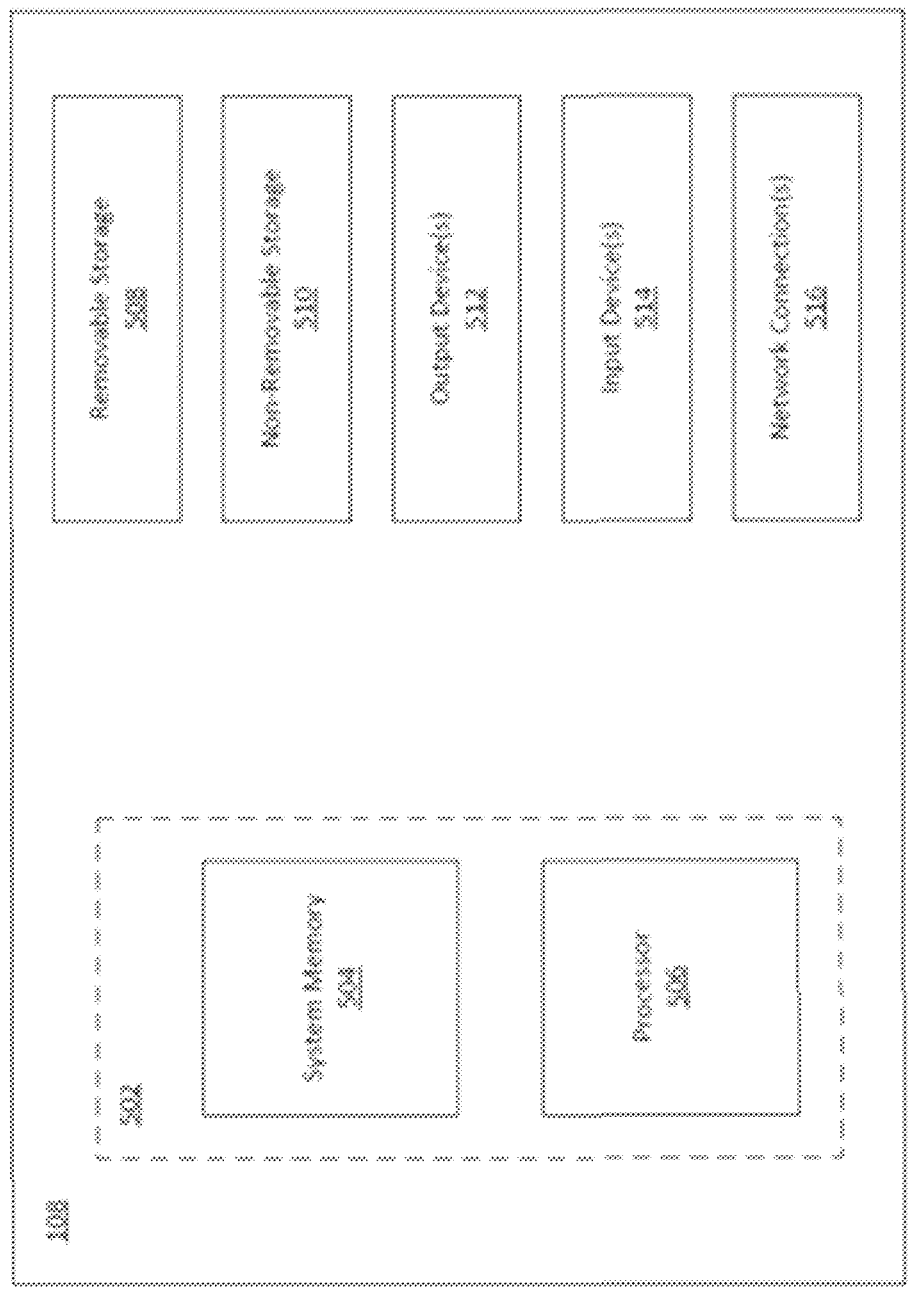
FIG. 16 shows an exemplary computing device upon which aspects of embodiments of the invention may be implemented.

When the logical operations described herein are implemented in software, the process may execute on any type of computing architecture or platform. For example, referring to FIG. 16, an example computing device upon which embodiments of the invention may be implemented is illustrated. The processing unit 108 may include a bus or other communication mechanism for communicating information among various components of the processing unit 108. In its most basic configuration, processing unit 108 typically includes at least one processor 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 16 by dashed line 502. The processor 506 may be a standard programmable processor that performs arithmetic and logic operations necessary for operation of the processing unit 108.

Processing unit 108 may have additional features/functionality. For example, processing unit 108 may include additional storage such as removable storage 508 and non-removable storage 510 including, but not limited to, magnetic or optical disks or tapes. Processing unit 108 may also contain network connection(s) 516 that allow the device to communicate with other devices. Processing unit 108 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the processing unit 108. All these devices are well known in the art and need not be discussed at length here.

The processor 406 may be configured to execute program code encoded in tangible, computer-readable media. Computer-readable media refers to any media that is capable of providing data that causes the processing unit 108 (i.e., a machine) to operate in a particular fashion. Various computer-readable media may be utilized to provide instructions to the processor 506 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below.

Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processor 406 may execute program code stored in the system memory 504. For example, the bus may carry data to the system memory 504, from which the processor 506 receives and executes instructions. The data received by the system memory 504 may optionally be stored on the removable storage 508 or the non-removable storage 510 before or after execution by the processor 506.

Processing unit 108 typically includes a variety of computer-readable media. Computer-readable media can be any available media that can be accessed by device 108 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by processing unit 108. Any such computer storage media may be part of processing unit 108.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for routing communication in a hierarchical hybrid wireless network ($H^2WN$) comprising:
   providing the $H^2WN$ comprised of at least two levels, a higher level and a lower level, wherein each level is comprised of a plurality of nodes and each of the plurality of nodes comprise a multi-beam smart antenna (MBSA);
   providing bio-inspired communication routing in each of the higher level and the lower level of the $H^2WN$; and
   providing congestion control in the communication routing, wherein the congestion control comprises a transport layer protocol that considers characteristics of MBSAs, and the transport layer protocol comprises adaptive batch coding (ABC).

2. The method of claim 1, wherein providing the bio-inspired communication routing in each of the higher level and the lower level of the $H^2WN$ comprise providing one or more of neuron-inspired higher level network routing, moth-inspired lower level network routing, and ant-inspired cross-level routing.

3. The method of claim 2, wherein the neuron-inspired higher level network routing comprises utilizing a fence routing algorithm to dispatch data to multiple beams of one or more of the MBSAs that comprise the higher level network.

4. The method of claim 2, wherein the moth-inspired lower level network routing comprises utilizing a line-fan-ring (LFR) routing search algorithm to handle a sink's singular mobility issue in the lower level network.

5. The method of claim 2, wherein the ant-inspired cross-level routing comprises one or more lower level nodes recording a trajectory of a commander node that is in the higher level network, and creating a time-decaying routing path to reach the commander node from any place in the low-level network.

6. The method of claim 1, wherein the ABC comprises automatically adjusting a size of a redundancy matrix size based on congestion control levels, wherein the ABC adaptively adds low redundancy to data in order to resist general loss due to allow level of congestion and adopts fast retransmission and shrinks a coding batch size during high congestion situations.

7. A hierarchical hybrid wireless network ($H^2WN$) comprising:
   a plurality of nodes arranged into a higher level and a lower level, wherein each of the plurality of nodes comprise a multi-beam smart antenna (MBSA), each MBSA comprising a processor, a transmitter, and a receiver, wherein the processor implements:
   a bio-inspired communication routing protocol in each of the higher and lower levels of the $H^2WN$ to route communications from a source to a destination; and
   a congestion control protocol, wherein the congestion control protocol provides congestion control of the communications among the plurality of nodes when routing the communications from the source to the destination, wherein the congestion control protocol comprises a transport layer protocol that considers characteristics of MBSAs, and the transport layer protocol comprises adaptive batch coding (ABC).

8. The $H^2WN$ of claim 7, wherein the bio-inspired communication routing in each of the higher level and the lower level of the $H^2WN$ comprise one or more of neuron-inspired higher level network routing, moth-inspired lower level network routing, and ant-inspired cross-level routing.

9. The $H^2WN$ of claim 8, wherein the neuron-inspired higher level network routing comprises utilizing a fence routing algorithm to dispatch data to multiple beams of one or more of the MBSAs that comprise the higher level network.

10. The $H^2WN$ of claim 8, wherein the moth-inspired lower level network routing comprises utilizing a line-fan-ring (LFR) routing search algorithm to handle a sink's singular mobility issue in the lower level network.

11. The $H^2WN$ of claim 8, wherein the ant-inspired cross-level routing comprises one or more lower level nodes recording a trajectory of a commander node that is in the higher level network, and creating a time-decaying routing path to reach the commander node from any place in the low-level network.

12. The $H^2WN$ of claim 7, wherein the ABC comprises automatically adjusting a size of a redundancy matrix size based on congestion control levels, wherein the ABC adaptively adds low redundancy to data in order to resist general loss due to allow level of congestion and adopts fast retransmission and shrinks a coding batch size during high congestion situations.

13. A non-transitory computer program product comprised of computer-executable code sections on a computer-readable medium, said code sections for performing a method for routing communication in a hierarchical hybrid wireless network ($H^2WN$), said method comprising:
   executing a bio-inspired communication routing protocol in each of a higher level and a lower level of the $H^2WN$, wherein each level of the $H^2WN$ is comprised of a plurality of nodes and each of the plurality of nodes comprise a multi-beam smart antenna (MBSA); and performing congestion control in the communication routing, wherein the congestion control comprises a transport layer protocol that considers characteristics of MBSAs, and the transport layer protocol comprises adaptive batch coding (ABC).

14. The non-transitory computer program product of claim 13, wherein executing the bio-inspired communication routing in each of the higher level and the lower level of the H²WN comprise executing one or more of neuron-inspired higher level network routing, moth-inspired lower level network routing, and ant-inspired cross-level routing.

15. The non-transitory computer program product of claim 14, wherein the neuron-inspired higher level network routing comprises utilizing a fence routing algorithm to dispatch data to multiple beams of one or more of the MBSAs that comprise the higher level network.

16. The non-transitory computer program product of claim 14, wherein the moth-inspired lower level network routing comprises utilizing a line-fan-ring (LFR) routing search algorithm to handle a sink's singular mobility issue in the lower level network.

17. The non-transitory computer program product of claim 14, wherein the ant-inspired cross-level routing comprises one or more lower level nodes recording a trajectory of a commander node that is in the higher level network, and creating a time-decaying routing path to reach the commander node from any place in the low-level network.

18. The non-transitory computer program product of claim 13, wherein the ABC comprises automatically adjusting a size of a redundancy matrix size based on congestion control levels, wherein the ABC adaptively adds low redundancy to data in order to resist general loss due to allow level of congestion and adopts fast retransmission and shrinks a coding batch size during high congestion situations.

* * * * *